US012672131B2

(12) United States Patent
Khoshnevisan et al.

(10) Patent No.: US 12,672,131 B2
(45) Date of Patent: Jun. 30, 2026

(54) PRIORITIZATION FOR SIMULTANEOUS UPLINK TRANSMISSIONS

(71) Applicant: QUALCOMM Incorporated, San Diego, CA (US)

(72) Inventors: Mostafa Khoshnevisan, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 18/307,480

(22) Filed: Apr. 26, 2023

(65) Prior Publication Data

US 2023/0354322 A1 Nov. 2, 2023

Related U.S. Application Data

(60) Provisional application No. 63/336,138, filed on Apr. 28, 2022.

(51) Int. Cl.
*H04W 72/1268* (2023.01)
*H04W 72/23* (2023.01)
*H04W 72/56* (2023.01)

(52) U.S. Cl.
CPC ....... *H04W 72/1268* (2013.01); *H04W 72/23* (2023.01); *H04W 72/56* (2023.01)

(58) Field of Classification Search
CPC . H04W 72/1268; H04W 72/23; H04W 72/56; H04W 72/115; H04W 72/569
See application file for complete search history.

(56) References Cited

U.S. PATENT DOCUMENTS

| | | | |
|---|---|---|---|
| 2018/0279358 A1* | 9/2018 | Babaei | H04W 72/0453 |
| 2019/0159140 A1* | 5/2019 | Wang | H04W 52/325 |
| 2020/0137768 A1* | 4/2020 | Jose | H04W 72/21 |
| 2020/0163023 A1* | 5/2020 | Pelletier | H04W 52/38 |
| 2020/0259601 A1* | 8/2020 | Zhou | H04L 5/0085 |
| 2021/0022132 A1* | 1/2021 | Park | H04W 52/281 |

(Continued)

OTHER PUBLICATIONS

International Search Report and Written Opinion—PCT/US2023/020206—ISA/EPO—Aug. 16, 2023.

(Continued)

*Primary Examiner* — Alison Slater
(74) *Attorney, Agent, or Firm* — Holland & Hart LLP

(57) ABSTRACT

Methods, systems, and devices for wireless communication are described. A user equipment (UE) may receive signaling that schedules a set of uplink transmissions that at least partially overlap in a time domain, the set of uplink transmissions including at least one dynamic grant based uplink transmission and at least one configured grant based uplink transmission, each uplink transmission is associated with a corresponding transmission group of a set of available transmission groups for simultaneous serving cell transmissions. The UE may receive a control message indicating a prioritization configuration for the set of uplink transmissions that at least partially overlap in the time domain. The UE may cancel at least an overlapping portion of one uplink transmission in the set of uplink transmissions based at least in part on the at least partial overlap in the time domain, the corresponding transmission group, and the prioritization configuration.

30 Claims, 18 Drawing Sheets

(56)         References Cited

U.S. PATENT DOCUMENTS

| | | | |
|---|---|---|---|
| 2021/0243779 A1 | 8/2021 | Takeda et al. | |
| 2021/0258981 A1 | 8/2021 | Hosseini et al. | |

OTHER PUBLICATIONS

Qualcomm Incorporated: "Intra-UE Multiplexing and Prioritization for IOT and URLLC", 3GPP TSG RAN WG1 #107-e, R1-2112211, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, 25 Pages, XP052075317, Section 2, p. 1-p. 3.

\* cited by examiner

510

505

Scheduling
Signaling

515

Control
Signaling

520

Cancel
PUSCH

525

500

130

105

115

Network
Entity

Transceiver

1310

Antenna

1315

Communications
Manager

1320

Memory

Code

1330

1325

1340

Processor

1335

1305

1300

Figure 14:
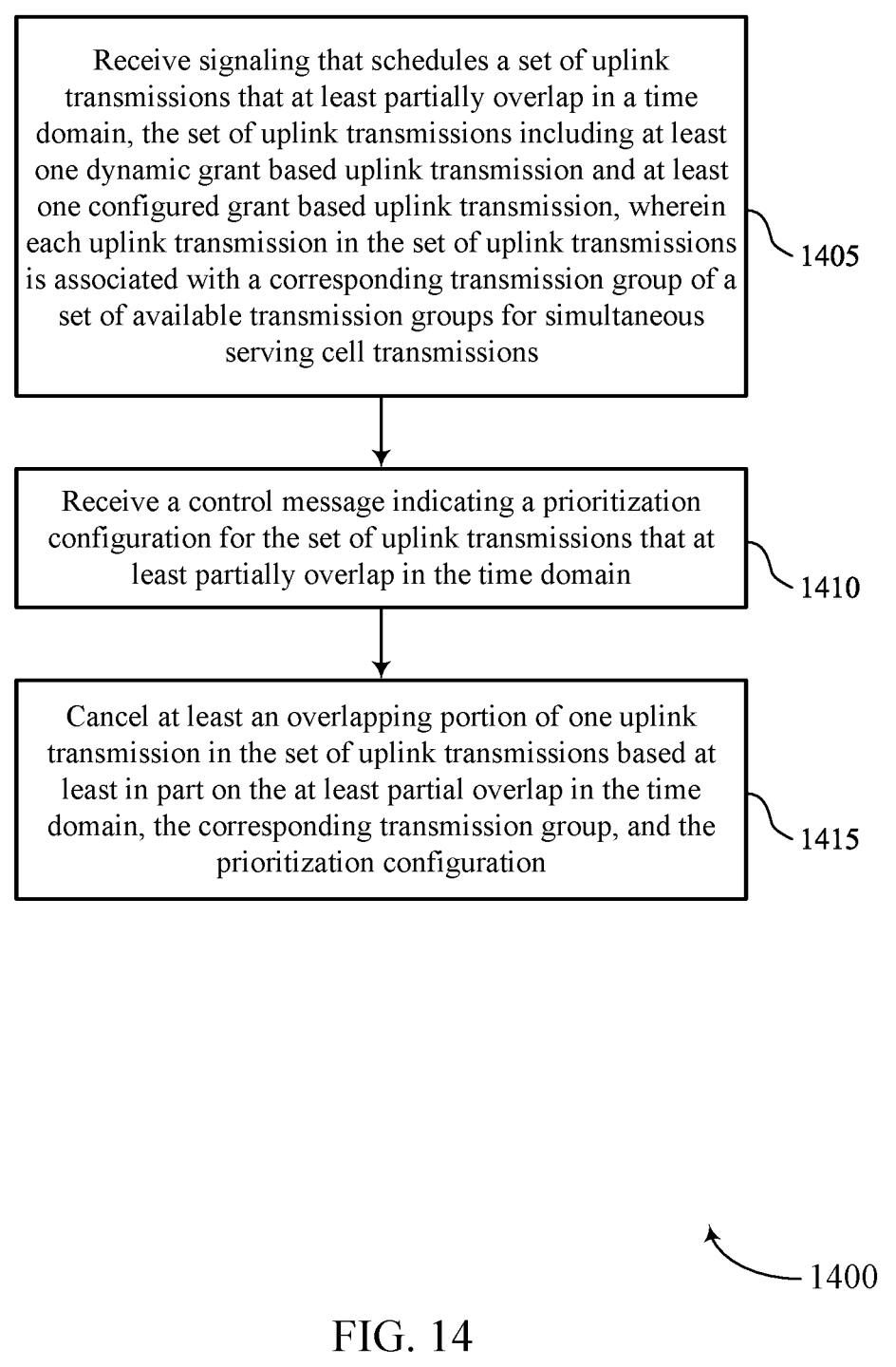

Receive signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions

1405

Receive a control message indicating a prioritization configuration for the set of uplink transmissions that at least partially overlap in the time domain

1410

Cancel at least an overlapping portion of one uplink transmission in the set of uplink transmissions based at least in part on the at least partial overlap in the time domain, the corresponding transmission group, and the prioritization configuration

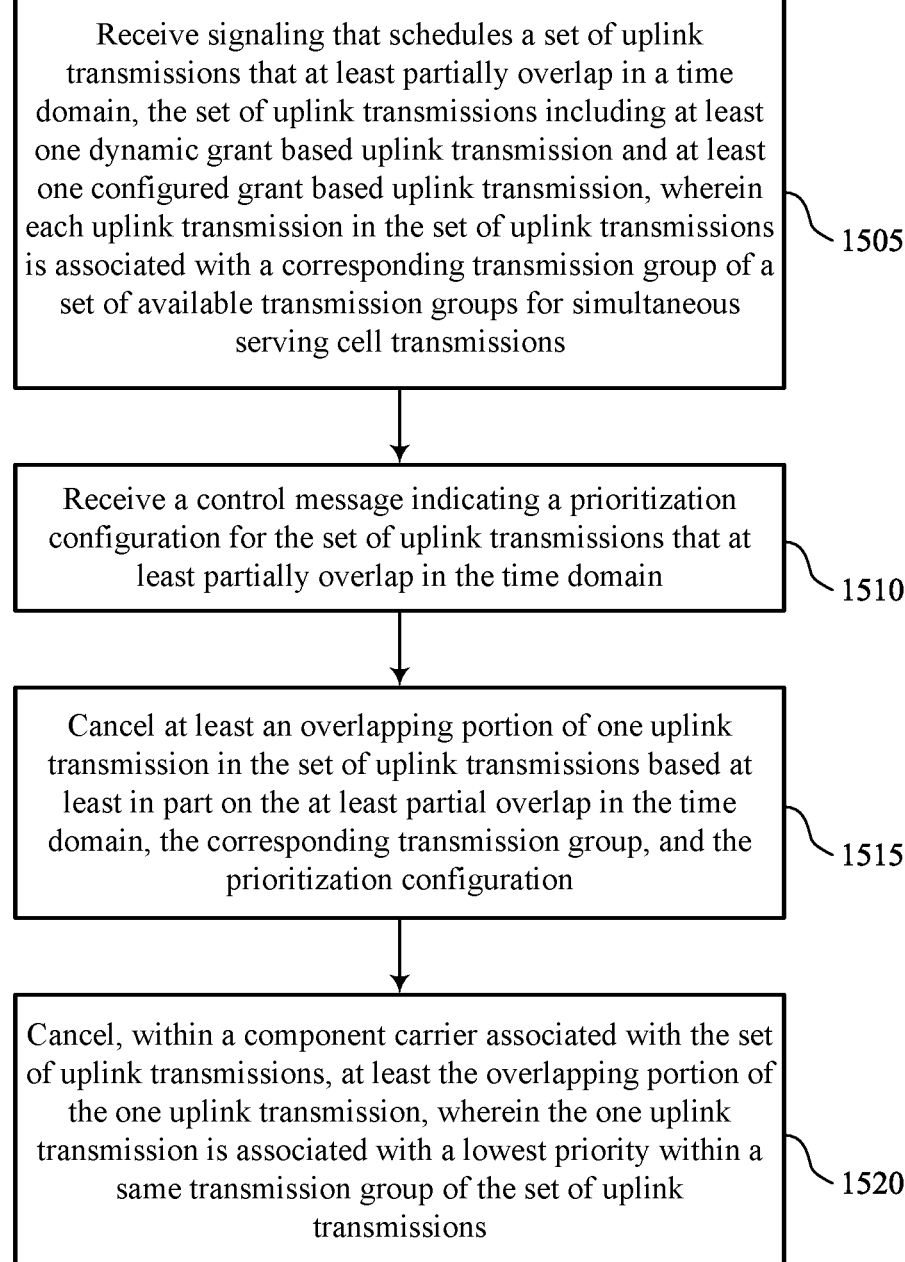

Receive signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions

1505

Receive a control message indicating a prioritization configuration for the set of uplink transmissions that at least partially overlap in the time domain

1510

Cancel at least an overlapping portion of one uplink transmission in the set of uplink transmissions based at least in part on the at least partial overlap in the time domain, the corresponding transmission group, and the prioritization configuration

1515

Cancel, within a component carrier associated with the set of uplink transmissions, at least the overlapping portion of the one uplink transmission, wherein the one uplink transmission is associated with a lowest priority within a same transmission group of the set of uplink transmissions

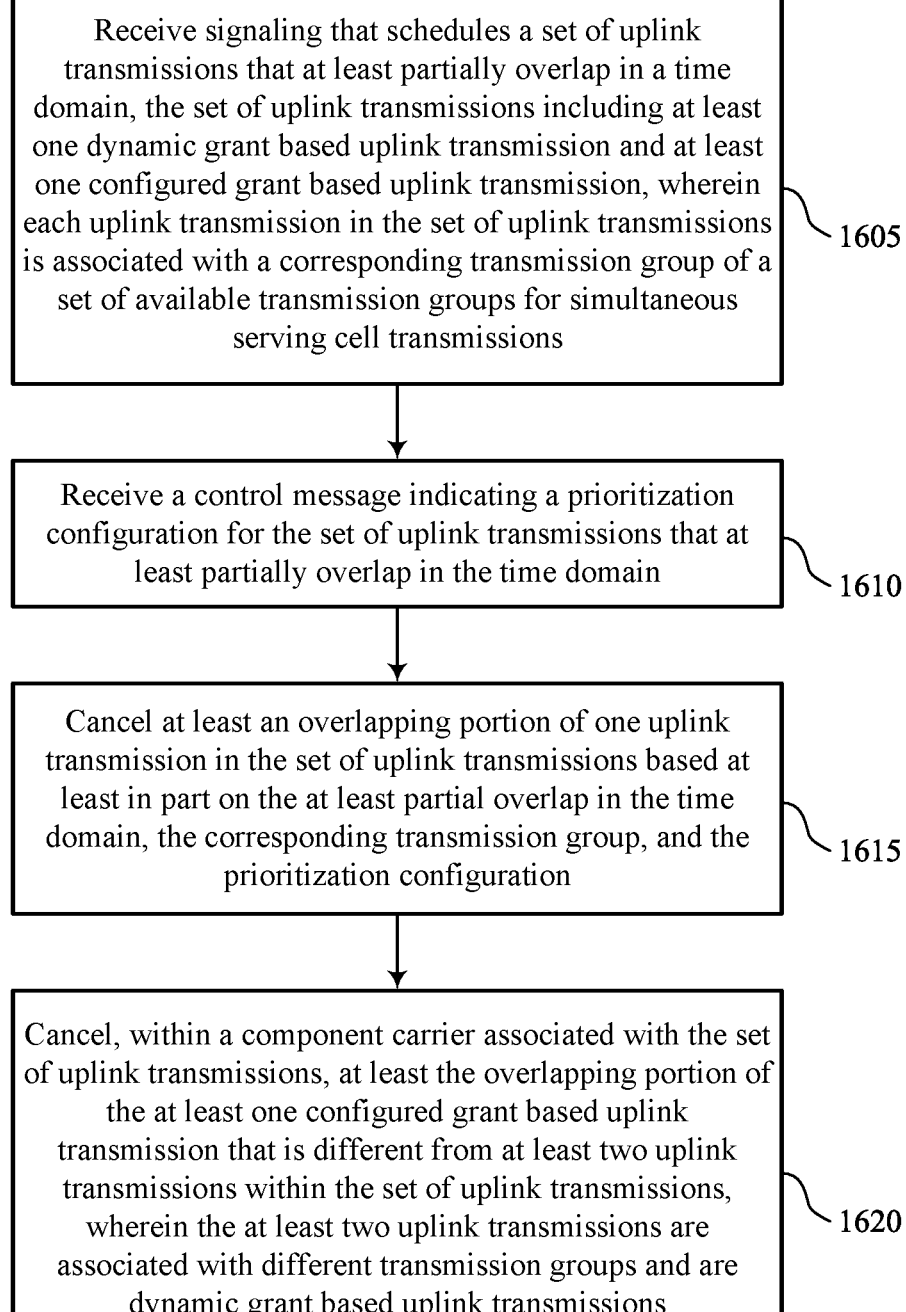

Receive signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions

1605

Receive a control message indicating a prioritization configuration for the set of uplink transmissions that at least partially overlap in the time domain

1610

Cancel at least an overlapping portion of one uplink transmission in the set of uplink transmissions based at least in part on the at least partial overlap in the time domain, the corresponding transmission group, and the prioritization configuration

1615

Cancel, within a component carrier associated with the set of uplink transmissions, at least the overlapping portion of the at least one configured grant based uplink transmission that is different from at least two uplink transmissions within the set of uplink transmissions, wherein the at least two uplink transmissions are associated with different transmission groups and are dynamic grant based uplink transmissions

Figure 17:
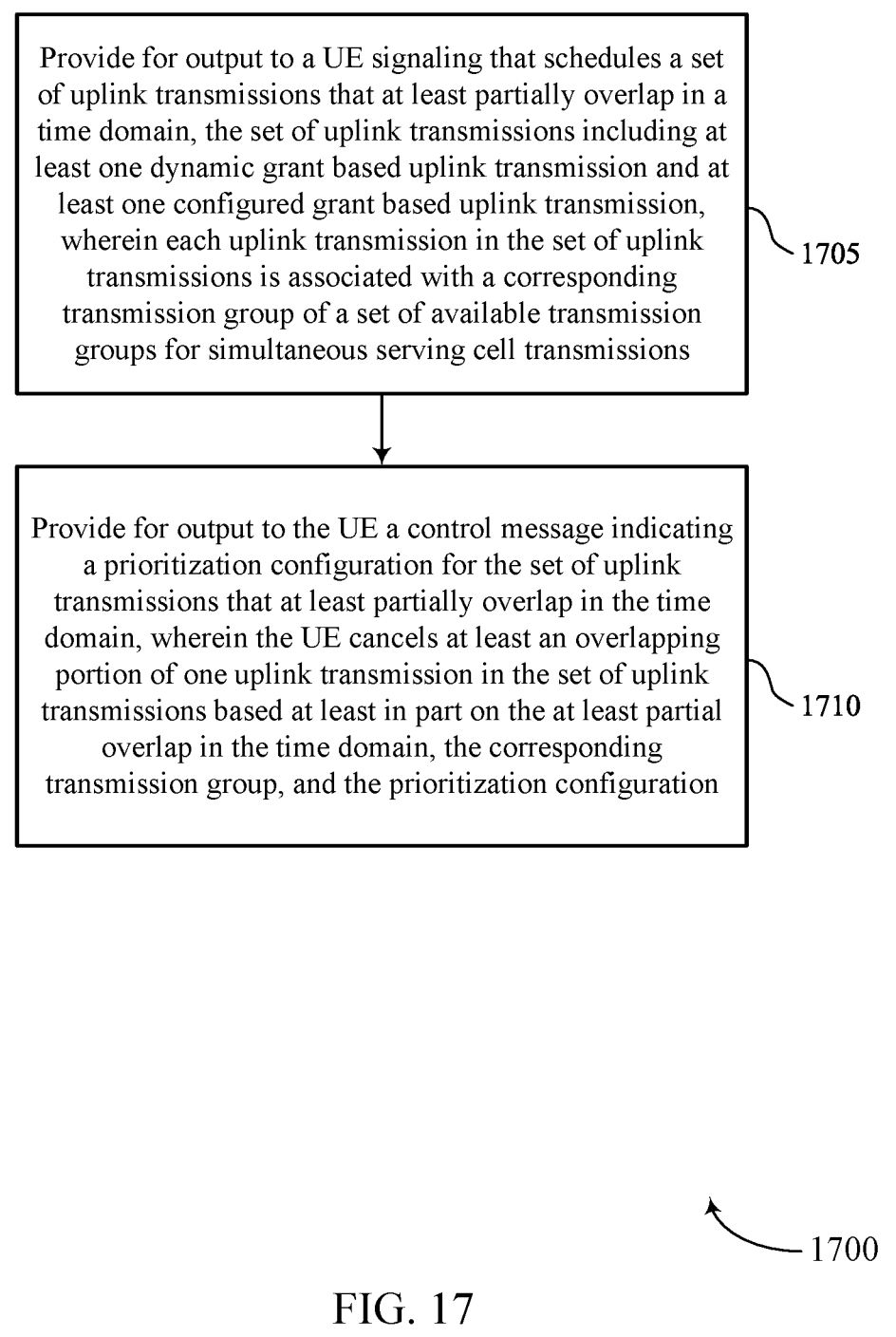

Provide for output to a UE signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions

1705

Provide for output to the UE a control message indicating a prioritization configuration for the set of uplink transmissions that at least partially overlap in the time domain, wherein the UE cancels at least an overlapping portion of one uplink transmission in the set of uplink transmissions based at least in part on the at least partial overlap in the time domain, the corresponding transmission group, and the prioritization configuration

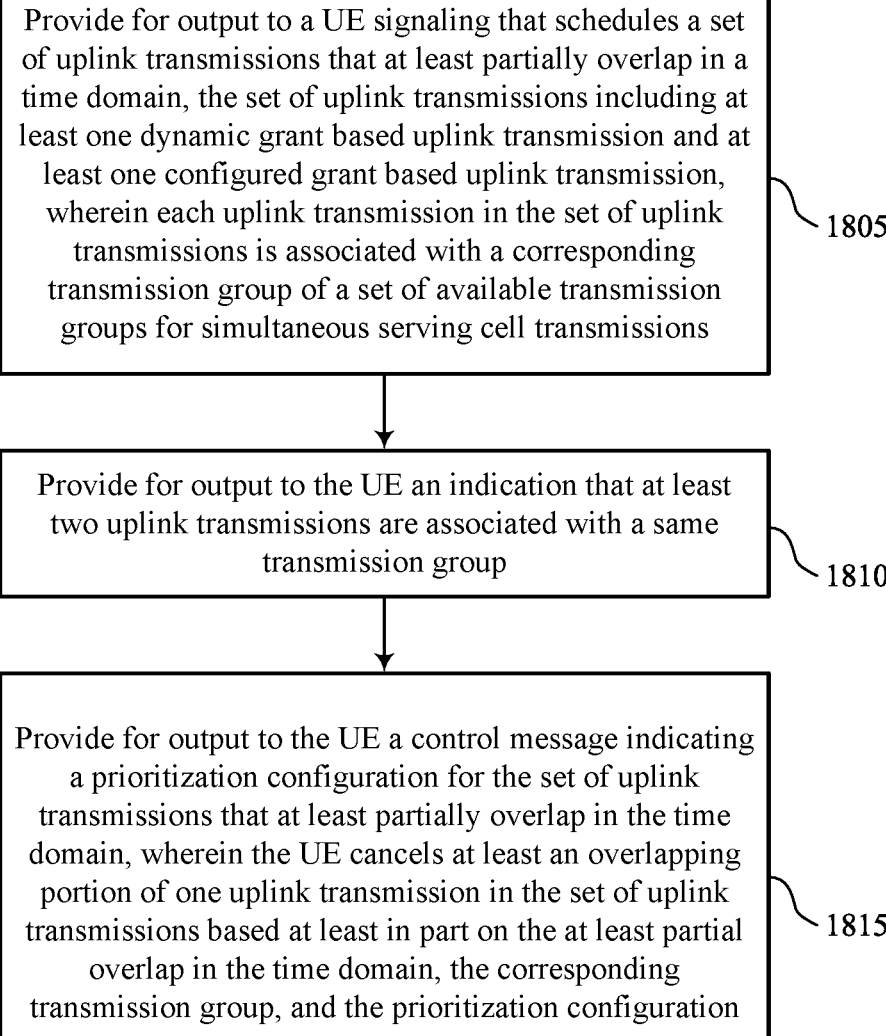

Provide for output to a UE signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions

1805

Provide for output to the UE an indication that at least two uplink transmissions are associated with a same transmission group

1810

Provide for output to the UE a control message indicating a prioritization configuration for the set of uplink transmissions that at least partially overlap in the time domain, wherein the UE cancels at least an overlapping portion of one uplink transmission in the set of uplink transmissions based at least in part on the at least partial overlap in the time domain, the corresponding transmission group, and the prioritization configuration

PRIORITIZATION FOR SIMULTANEOUS UPLINK TRANSMISSIONS

CROSS REFERENCE

The present application for patent claims the benefit of U.S. Provisional Patent Application No. 63/336,138 by KHOSHNEVISAN et al., entitled "PRIORITIZATION FOR SIMULTANEOUS UPLINK TRANSMISSIONS," filed Apr. 28, 2022, assigned to the assignee hereof, and expressly incorporated by reference herein.

TECHNICAL FIELD

The following relates to wireless communication, including prioritization for simultaneous uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support prioritization for simultaneous uplink transmissions. For example, the described techniques provide for various mechanisms for a user equipment (UE) to prioritize between overlapping uplink transmissions (e.g., physical uplink channel transmissions) based on the prioritization configuration provided to the UE as well as the transmission group of each overlapping uplink transmission. For example, the UE may receive or otherwise obtain signaling scheduling a set of uplink transmissions (e.g., two or more uplink transmissions) that overlap, at least partially, in the time domain. The set of uplink transmissions may include two or more uplink transmissions, such as at least one configured grant (CG) based uplink transmission and at least one dynamic grant (DG) based uplink transmission. The UE may also be configured with (e.g., receive or otherwise obtain control message(s) indicating) a prioritization configuration for overlapping transmissions. For example, the prioritization configuration may prioritize a high priority (HP)-DG uplink transmission over a low priority (LP)-CG uplink transmission or may prioritize a HP-CG uplink transmission over a LP-DG uplink transmission. Each uplink transmission may also be associated with a specific transmission group (e.g., at least two of the uplink transmissions may be associated with the same or with different transmission groups). The transmission groups may generally correspond to a control resource set pool index, an uplink beam, an uplink power control loop index, an antenna port, a timing advance command group, a physical cell identifier, or a synchronization signal block, alone or in any combination, for the uplink transmissions in the set of uplink transmissions. Accordingly, the UE may cancel some or all (e.g., at least a portion) of an uplink transmission according to the prioritization configuration and the overlap in the time domain. The UE may then perform the remaining uplink transmission(s) in the set of uplink transmissions that were not canceled or dropped.

A method for wireless communication at a UE is described. The method may include receiving signaling that schedules a set of uplink transmissions that at least partially overlap in a time domain, the set of uplink transmissions including at least one DG based uplink transmission and at least one CG based uplink transmission, where each uplink transmission in the set of uplink transmissions is associated with a corresponding transmission group of a set of available transmission groups for simultaneous serving cell transmissions, receiving a control message indicating a prioritization configuration for the set of uplink transmissions that at least partially overlap in the time domain, and canceling at least an overlapping portion of one uplink transmission in the set of uplink transmissions based on the at least partial overlap in the time domain, the corresponding transmission group, and the prioritization configuration.

An apparatus for wireless communication at a UE is described. The apparatus may include at least one processor, and memory coupled (e.g., operatively, communicatively, functionally, electronically, or electrically) with the at least one processor, the memory storing instructions executable by the at least one processor (e.g., directly, indirectly, after pre-processing, without pre-processing) to cause the UE to receive signaling that schedules a set of uplink transmissions that at least partially overlap in a time domain, the set of uplink transmissions including at least one DG based uplink transmission and at least one CG based uplink transmission, where each uplink transmission in the set of uplink transmissions is associated with a corresponding transmission group of a set of available transmission groups for simultaneous serving cell transmissions, receive a control message indicating a prioritization configuration for the set of uplink transmissions that at least partially overlap in the time domain, and cancel at least an overlapping portion of one uplink transmission in the set of uplink transmissions based on the at least partial overlap in the time domain, the corresponding transmission group, and the prioritization configuration.

Another apparatus for wireless communication at a UE is described. The apparatus may include means for receiving signaling that schedules a set of uplink transmissions that at least partially overlap in a time domain, the set of uplink transmissions including at least one DG based uplink transmission and at least one CG based uplink transmission, where each uplink transmission in the set of uplink transmissions is associated with a corresponding transmission group of a set of available transmission groups for simultaneous serving cell transmissions, means for receiving a control message indicating a prioritization configuration for the set of uplink transmissions that at least partially overlap in the time domain, and means for canceling at least an overlapping portion of one uplink transmission in the set of uplink transmissions based on the at least partial overlap in the time domain, the corresponding transmission group, and the prioritization configuration.

A non-transitory computer-readable medium storing code for wireless communication at a UE is described. The code may include instructions executable by a processor (e.g., directly, indirectly, after pre-processing, without pre-processing) to receive signaling that schedules a set of uplink transmissions that at least partially overlap in a time domain, the set of uplink transmissions including at least one DG based uplink transmission and at least one CG based uplink transmission, where each uplink transmission in the set of uplink transmissions is associated with a corresponding transmission group of a set of available transmission groups for simultaneous serving cell transmissions, receive a control message indicating a prioritization configuration for the set of uplink transmissions that at least partially overlap in the time domain, and cancel at least an overlapping portion of one uplink transmission in the set of uplink transmissions based on the at least partial overlap in the time domain, the corresponding transmission group, and the prioritization configuration.

In some examples of the method, apparatuses, and non-transitory computer-readable medium described herein, canceling at least the overlapping portion of one uplink transmission in the set of uplink transmissions may include operations, features, means, or instructions for canceling, within a CC associated with the set of uplink transmissions, at least the overlapping portion of the one uplink transmission, where the one uplink transmission may be associated with a lowest priority within a same transmission group of the set of uplink transmissions.

In some examples of the method, apparatuses, and non-transitory computer-readable medium described herein, the one uplink transmission includes a LP CG based uplink transmission and a remaining uplink transmission of the set of uplink transmissions includes a HP DG based uplink transmission, the one uplink transmission and the remaining uplink transmission associated with the same transmission group, and the prioritization configuration indicates that the HP DG based uplink transmission may be prioritized over the LP CG based uplink transmission.

In some examples of the method, apparatuses, and non-transitory computer-readable medium described herein, the one uplink transmission includes a LP DG based uplink transmission and a remaining uplink transmission of the set of uplink transmissions includes a HP CG based uplink transmission, the one uplink transmission and the remaining uplink transmission associated with the same transmission group, and the prioritization configuration indicates that the HP CG based uplink transmission may be prioritized over the LP DG based uplink transmission.

In some examples of the method, apparatuses, and non-transitory computer-readable medium described herein, a default transmission group for CG based uplink transmissions, a received indication of the transmission group of the at least one CG based uplink transmission, or a transmission group of received DCI that activates the at least one CG based uplink transmission.

In some examples of the method, apparatuses, and non-transitory computer-readable medium described herein, the prioritization configuration may be configured on a per-transmission group basis.

In some examples of the method, apparatuses, and non-transitory computer-readable medium described herein, canceling at least the overlapping portion of one uplink transmission in the set of uplink transmissions may include operations, features, means, or instructions for canceling, within a CC associated with the set of uplink transmissions, at least the overlapping portion of the at least one CG based uplink transmission that may be different from at least two uplink transmissions within the set of uplink transmissions, where the at least two uplink transmissions may be associated with different transmission groups and may be DG based uplink transmissions.

In some examples of the method, apparatuses, and non-transitory computer-readable medium described herein, canceling at least the overlapping portion of one uplink transmission in the set of uplink transmissions may include operations, features, means, or instructions for canceling at least the overlapping portion of the at least one CG based uplink transmission prior to a first symbol of the at least one CG based uplink transmission that overlaps with a first DG based uplink transmission, with a second DG based uplink transmission, or a combination thereof, in the at least two uplink transmissions.

Some examples of the method, apparatuses, and non-transitory computer-readable medium described herein may further include operations, features, means, or instructions for determining a first starting symbol of the first DG based uplink transmission and a second starting symbol of the second DG based uplink transmission and identifying the first symbol of the at least one CG based uplink transmission that overlaps with the first DG based uplink transmission, the second DG based uplink transmission, or the combination thereof, based on the first starting symbol or the second starting symbol.

In some examples of the method, apparatuses, and non-transitory computer-readable medium described herein, canceling at least the overlapping portion of one uplink transmission in the set of uplink transmissions may include operations, features, means, or instructions for canceling, within a CC associated with the set of uplink transmissions, at least the overlapping portion of a DG based uplink transmission from at least two uplink transmissions within the set of uplink transmissions, where the at least two uplink transmissions may be associated with different transmission groups and the DG based uplink transmission includes a LP uplink transmission.

In some examples of the method, apparatuses, and non-transitory computer-readable medium described herein, the prioritization configuration indicates that a HP CG based uplink transmission may be prioritized over a LP DG based uplink transmission.

In some examples of the method, apparatuses, and non-transitory computer-readable medium described herein, canceling at least the overlapping portion of one uplink transmission in the set of uplink transmissions may include operations, features, means, or instructions for canceling at least the overlapping portion of a first DG based uplink transmission, a second DG based uplink transmission, or a combination thereof, of the at least two uplink transmissions prior to a first symbol of the corresponding DG based uplink transmission that overlaps with the at least one CG based uplink transmission in the set of uplink transmissions, where the at least one CG based uplink transmission includes a HP uplink transmission.

In some examples of the method, apparatuses, and non-transitory computer-readable medium described herein, canceling at least the overlapping portion of one uplink transmission in the set of uplink transmissions may include operations, features, means, or instructions for canceling at least the overlapping portion of the first DG based uplink transmission or the second DG based uplink transmission based on one or more of a transmission group, an earliest start time, an earliest end time, a latest start time, a latest end time, a duration, a number of overlapping symbols, a modulation and coding scheme, or a combination thereof, of the first DG based uplink transmission, the second DG based uplink transmission, or both.

In some examples of the method, apparatuses, and non-transitory computer-readable medium described herein, a control resource set pool index, an uplink beam, an uplink power control loop index, an antenna port, a timing advance command, a physical cell identifier, a synchronization signal block, a sounding reference signal resource identifier, or a combination thereof.

A method for wireless communication at a network entity is described. The method may include providing for output to a UE signaling that schedules a set of uplink transmissions that at least partially overlap in a time domain, the set of uplink transmissions including at least one DG based uplink transmission and at least one CG based uplink transmission, where each uplink transmission in the set of uplink transmissions is associated with a corresponding transmission group of a set of available transmission groups for simultaneous serving cell transmissions and providing for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration.

An apparatus for wireless communication at a network entity is described. The apparatus may include at least one processor, and memory coupled (e.g., operatively, communicatively, functionally, electronically, or electrically) with the at least one processor, the memory storing instructions executable by the at least one processor (e.g., directly, indirectly, after pre-processing, without pre-processing) to cause the network entity to provide for output to a UE signaling that schedules a set of uplink transmissions that at least partially overlap in a time domain, the set of uplink transmissions including at least one DG based uplink transmission and at least one CG based uplink transmission, where each uplink transmission in the set of uplink transmissions is associated with a corresponding transmission group of a set of available transmission groups for simultaneous serving cell transmissions and provide for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration.

Another apparatus for wireless communication at a network entity is described. The apparatus may include means for providing for output to a UE signaling that schedules a set of uplink transmissions that at least partially overlap in a time domain, the set of uplink transmissions including at least one DG based uplink transmission and at least one CG based uplink transmission, where each uplink transmission in the set of uplink transmissions is associated with a corresponding transmission group of a set of available transmission groups for simultaneous serving cell transmissions and means for providing for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration.

A non-transitory computer-readable medium storing code for wireless communication at a network entity is described. The code may include instructions executable by a processor (e.g., directly, indirectly, after pre-processing, without pre-processing) to provide for output to a UE signaling that schedules a set of uplink transmissions that at least partially overlap in a time domain, the set of uplink transmissions including at least one DG based uplink transmission and at least one CG based uplink transmission, where each uplink transmission in the set of uplink transmissions is associated with a corresponding transmission group of a set of available transmission groups for simultaneous serving cell transmissions and provide for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration.

In some examples of the method, apparatuses, and non-transitory computer-readable medium described herein, the one uplink transmission includes a LP CG based uplink transmission and a remaining uplink transmission of the set of uplink transmissions includes a HP DG based uplink transmission, the one uplink transmission and the remaining uplink transmission associated with the same transmission group, and the prioritization configuration indicates that the HP DG based uplink transmission may be prioritized over the LP CG based uplink transmission.

In some examples of the method, apparatuses, and non-transitory computer-readable medium described herein, the one uplink transmission includes a LP DG based uplink transmission and a remaining uplink transmission of the set of uplink transmissions includes a HP CG based uplink transmission, the one uplink transmission and the remaining uplink transmission associated with the same transmission group, and the prioritization configuration indicates that the HP CG based uplink transmission may be prioritized over the LP DG based uplink transmission.

Some examples of the method, apparatuses, and non-transitory computer-readable medium described herein may further include operations, features, means, or instructions for providing for output to the UE an indication that at least two uplink transmissions in the set of uplink transmissions may be associated with a same transmission group.

In some examples of the method, apparatuses, and non-transitory computer-readable medium described herein, providing for output to the UE the control message indicating the prioritization configuration may include operations, features, means, or instructions for providing for output to the UE an indication of the prioritization configuration prioritizing a HP DG based uplink transmission over a LP CG based uplink transmission.

In some examples of the method, apparatuses, and non-transitory computer-readable medium described herein, the corresponding transmission group of each of at least two uplink transmissions in the set of uplink transmissions may be defined according to one or more of a control resource set pool index, an uplink beam, an uplink power control loop index, an antenna port, a timing advance command, a physical cell identifier, a synchronization signal block, a sounding reference signal resource identifier, or a combination thereof.

BRIEF DESCRIPTION OF THE DRAWINGS

FIGS. 14 through 18 show flowcharts illustrating methods that support prioritization for simultaneous uplink transmissions in accordance with one or more aspects of the present disclosure.

DETAILED DESCRIPTION

Figure 1:
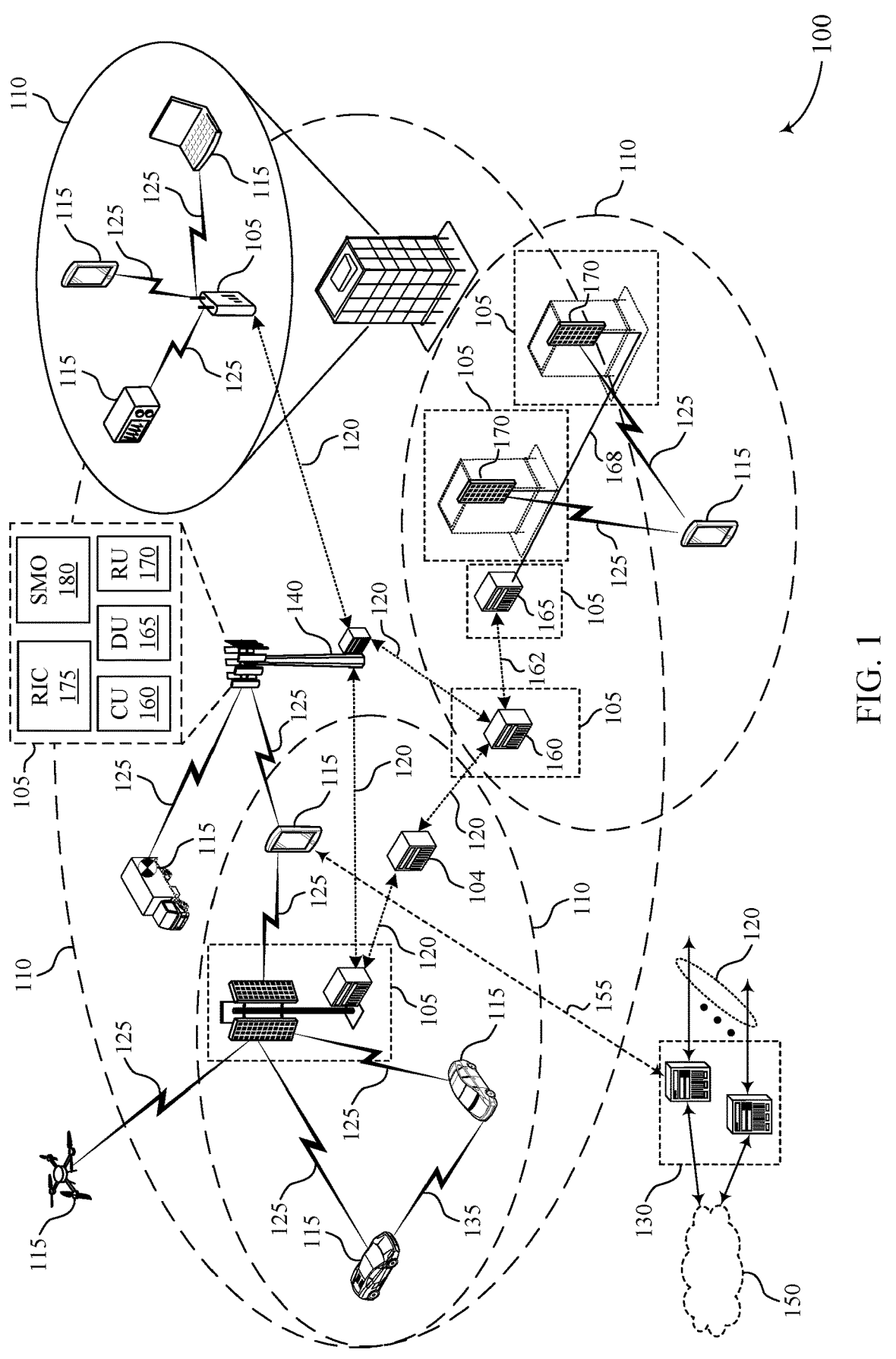
FIG. 1 illustrates an example of a wireless communications system that supports prioritization for simultaneous uplink transmissions in accordance with one or more aspects of the present disclosure.

Wireless communications systems may generally support uplink transmissions from a user equipment (UE) to a network entity or downlink transmissions from the network entity to the UE. For example, such wireless networks may support a UE performing a dynamic grant (DG) based uplink transmission (e.g., using a downlink control information (DCI) based dynamic grant that both schedules the uplink transmission and identifies resources, configurations, or parameters to be used for the uplink transmission). Such wireless networks may also support the UE performing a configured grant (CG) based uplink transmission (e.g., using radio resource control (RRC) configured resources, configurations, or parameters that are automatically activated or may be activated by a DCI indicating which CG configuration is being activated for the uplink transmission).

However, in some situations CG based uplink transmissions may be scheduled such that they overlap, at least to some degree, in the time domain with a DG based uplink transmission. This overlap may result in the UE dropping at least one of the uplink transmissions (e.g., the CG based uplink transmission, in some examples) or canceling at least a portion of one of the uplink transmissions (e.g., some or all of the CG or DG based uplink transmissions). In some examples, each uplink transmission may be associated with a corresponding priority level (e.g., high priority (HP) or low priority (LP)), and the UE simply cancels the lowest priority uplink transmission to resolve the overlap. However, such techniques are limiting in that they may not provide a mechanism where the UE can prioritize between overlapping uplink transmissions based on additional factors.

Accordingly, aspects of the techniques described herein provide various mechanisms for a UE to prioritize between overlapping uplink transmissions (e.g., physical uplink channel transmissions) based on the prioritization configuration provided to the UE as well as the transmission group of each overlapping uplink transmission. For example, the UE may receive or otherwise obtain signaling scheduling a set of uplink transmissions (e.g., two or more uplink transmissions) that overlap, at least partially, in the time domain. The set of uplink transmissions may include two or more uplink transmissions, such as at least one CG based uplink transmission and at least one DG based uplink transmission. The UE may also be configured with (e.g., receive or otherwise obtain control message(s) indicating) a prioritization configuration for overlapping transmissions. For example, the prioritization configuration may prioritize a HP-DG uplink transmission over a LP-CG uplink transmission or may prioritize a HP-CG uplink transmission over a LP-DG uplink transmission. Each uplink transmission may also be associated with a specific transmission group (e.g., at least two of the uplink transmissions may be associated with the same or with different transmission groups). The transmission groups may generally correspond to a control resource set pool index, an uplink beam, an uplink power control loop index, an antenna port, a timing advance command group, a physical cell identifier, or a SSB, for the uplink transmissions in the set of uplink transmissions. Accordingly, the UE may cancel some or all (e.g., at least a portion) of an uplink transmission according to the prioritization configuration and the overlap in the time domain. The UE may then perform the remaining uplink transmission(s) in the set of uplink transmissions that were not canceled or dropped.

Aspects of the disclosure are initially described in the context of wireless communications systems. Aspects of the disclosure are further illustrated by and described with reference to apparatus diagrams, system diagrams, and flowcharts that relate to prioritization for simultaneous uplink transmissions.

FIG. 1 illustrates an example of a wireless communications system 100 that supports prioritization for simultaneous uplink transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). It is to be understood that the N2 interface protocol discussed here is different from an N2 scheduling time parameter discussed later that is utilized in accordance with aspects of the techniques described herein. In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support prioritization for simultaneous uplink transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may receive signaling that schedules a set of uplink transmissions that at least partially overlap in a time domain, the set of uplink transmissions including at least one DG based uplink transmission and at least one CG based uplink transmission, wherein each uplink transmission in the set of uplink transmissions is associated with a corresponding transmission group of a set of available transmission groups for simultaneous serving cell transmissions (e.g., simultaneous uplink transmissions to different cells or CCs). The UE 115 may receive a control message indicating a prioritization configuration for the set of uplink transmissions that at least partially overlap in the time domain. The UE 115 may cancel at least an overlapping portion of one uplink transmission in the set of uplink transmissions based at least in part on the at least partial overlap in the time domain, the corresponding transmission group, and the prioritization configuration.

A network entity 105 may provide for output to a UE 115 signaling that schedules a set of uplink transmissions that at least partially overlap in a time domain, the set of uplink transmissions including at least one DG based uplink transmission and at least one CG based uplink transmission, wherein each uplink transmission in the set of uplink transmissions is associated with a corresponding transmission group of a set of available transmission groups for simultaneous serving cell transmissions. The network entity 105 may provide for output to the UE 115 a control message indicating a prioritization configuration for the set of uplink transmissions that at least partially overlap in the time domain, wherein the UE cancels at least an overlapping portion of one uplink transmission in the set of uplink transmissions based at least in part on the at least partial overlap in the time domain, the corresponding transmission group, and the prioritization configuration.

Figure 2A:
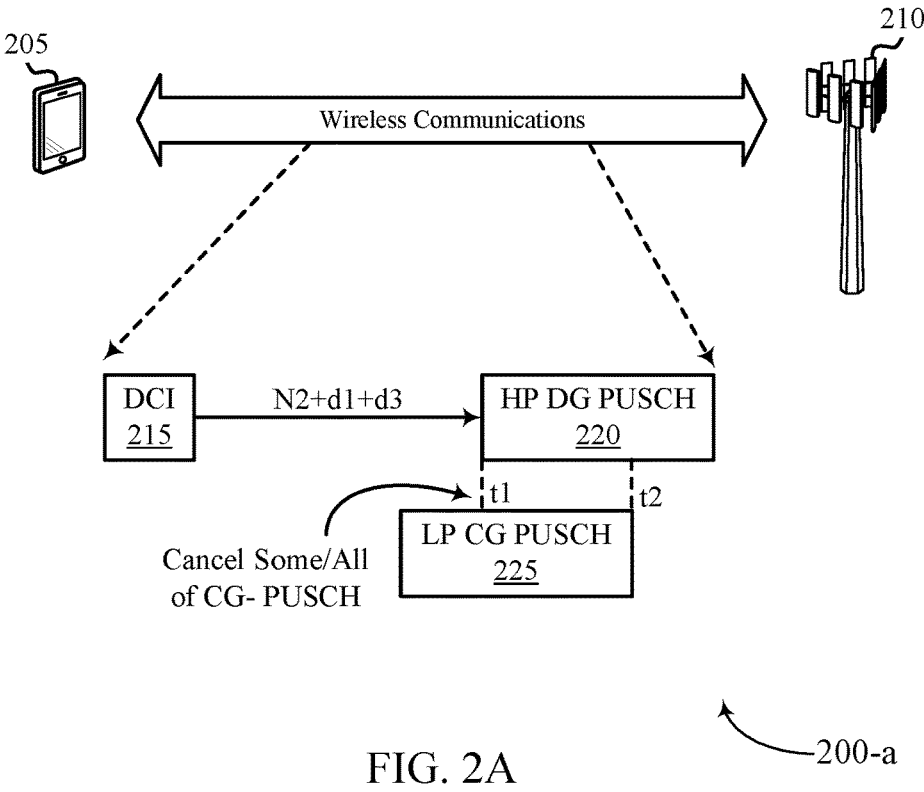
FIGS. 2A and 2B illustrate examples of a wireless communications system that supports prioritization for simultaneous uplink transmissions in accordance with one or more aspects of the present disclosure.
Figure 2B:
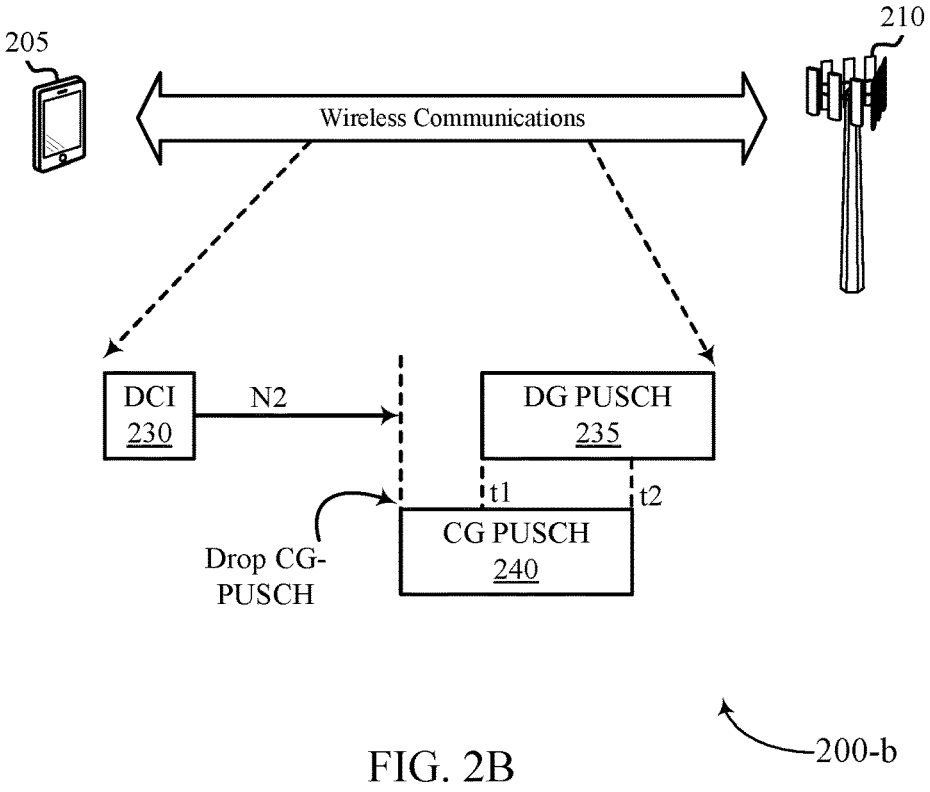

FIGS. 2A-2B illustrate examples of a wireless communications system 200 that supports prioritization for simultaneous uplink transmissions in accordance with one or more aspects of the present disclosure. Wireless communications system 200 may implement aspects of wireless communications system 100. Wireless communications system 200 may include UE 205 or network entity 210, which may be examples of the corresponding devices described herein.

Wireless communications systems may generally support uplink transmissions from UE 205 to network entity 210 or downlink transmissions from the network entity 210 to UE 205. For example, such wireless networks may support UE 205 performing a DG based uplink transmission (e.g., using DCI 215 that conveys a DG based grant that both schedules the uplink transmission and identifies resources, configurations, or parameters to be used for the uplink transmission). Such wireless networks may also support UE 205 performing a CG based uplink transmission (e.g., using RRC configured resources, configurations, or parameters that are automatically activated or may be activated by a DCI indicating which CG configuration is being activated for the uplink transmission). However, in some situations CG based uplink transmissions may be scheduled such that they overlap, at least to some degree, in the time domain with a DG based uplink transmission.

In some wireless networks, a CG based uplink transmission (e.g., CG PUSCH) may generally be not transmitted (e.g., dropped) in the situation where the CG based uplink transmission overlaps with a DG based uplink transmission. For example, such networks may generally define a N2 time parameter where the DCI scheduling the DG based uplink transmission is expected to be received N2 symbols prior to the CG based uplink transmissions (e.g., based on UE capability to allow the UE to decode and process the DCI). Such dropping based on the N2 timeline may be strictly enforced in such networks (e.g., such that a DCI scheduling a DG based uplink transmission that is received fewer than N2 symbols before the CG based uplink transmission is considered an error case). These wireless networks generally may not define a physical layer priority designation when applying the dropping rule (e.g., may not support HP or LP designations for configured uplink transmissions). Accordingly, in these wireless networks the UE is expected to drop a CG based uplink transmission (e.g., drop the whole CG based uplink transmission) that overlaps, at least to some degree, with a DG based uplink transmission in the time domain.

Some wireless networks may support the physical layer priority configurations for the uplink transmissions. Generally, such networks define that when two different uplink channels (e.g., uplink transmissions) with different priorities overlap in the time domain, the LP channel is canceled and the HP channel is transmitted. In some examples, when the two uplink transmissions have the same priority, the UE may multiplex a physical uplink control channel (PUCCH) uplink transmission with another PUCCH uplink transmission or a PUCCH uplink transmission with a PUSCH uplink transmission. When the two uplink transmissions are associated with different priority levels, the LP uplink transmission is canceled before the first symbol that overlaps with the HP uplink transmission (e.g., a HP PUCCH or PUSCH transmission). When the HP uplink transmission is scheduled by a DCI (e.g., a DCI scheduling a DG based uplink transmission), the cancellation timeline may be defined based on N2+d1, where d1 is a defined (e.g., by a standard, configuration signaling received at the UE, or the UE itself) integer value.

In some examples, the priority level (e.g., HP vs LP) may generally be indicated in the scheduling DCI (e.g., for PUCCH with HARQ-ACK, via RRC configuration signaling (e.g., for PUCCH with SR), or a default LP may be used (e.g., for PUCCH with CSI). In other examples, the priority level may generally be indicated in the scheduling DCI (e.g., for DG PUSCH using DCI formats 0_1 or 0_2) or as part of the RRC configuration signaling that configures the CG configuration used for the CG based uplink transmission (e.g., for CG PUSCH). In some networks, cancellation may not be specified for CG/DG overlap based on their associated physical layer priority level. In some examples of such networks, uplink transmission cancellation may be for PUCCH that overlaps with PUCCH or for PUCCH that overlaps with PUSCH.

Some wireless communications systems may support signaling a prioritization configuration to be used for overlapping uplink transmissions. Generally, such techniques may cancel the LP uplink transmission that overlaps with a HP uplink transmission. For example, the network may use higher layer signaling (such as RRC signaling, MAC CE signaling, or IP-based signaling) to configure the UE with a prioritization configuration (e.g., prioritizationBetweenHP-DG-PUSCHandLP-CG-PUSCH or a prioritizationBe-tweenHP-CG-PUSCHandLP-DG-PUSCH) to use when uplink transmissions overlap in the time domain. An additional processing time of N2+d1+d3 may be used for uplink transmission cancellation, where d3 defines, e.g., the OFDM symbol delay that is also based on UE capability or the subcarrier spacing (SCS) used for the uplink transmission. In a HP-DG/LP-CG overlapping uplink transmission scenario when the UE is configured with prioritizationBe-tweenHP-DG-PUSCHandLP-CG-PUSCH, the UE may cancel some or all of the LP CG based uplink transmission (e.g., the UE may transmit a first portion of the LP-CG based uplink transmission up to the last symbol before the first symbol of the overlapping HP-DG based uplink transmission or may drop the LP CG based uplink transmission). In a HP-CG/LP-DG overlapping uplink transmission scenario when the UE is configured with prioritizationBetweenHP-CG-PUSCHandLP-DG-PUSCH, the UE may cancel some or all of the LP DG based uplink transmission (e.g., the UE may transmit a first portion of the LP-DG based uplink transmission up to the last symbol before the first symbol of the overlapping HP-CG based uplink transmission or may drop the LP DG based uplink transmission). There is no processing timeline generally defined for the HP-CG/LP-DG scenario in some wireless networks.

This may result in the UE dropping at least one of the uplink transmissions (e.g., the CG based uplink transmission, in some examples) or canceling at least a portion of one of the uplink transmissions (e.g., some or all of the CG or DG based uplink transmissions). However, such techniques are limiting in that they may not provide a mechanism where the UE can prioritize between overlapping uplink transmissions based on additional factors.

For example, wireless communications system 200 (e.g., UE 205) may be configured to support simultaneous uplink transmissions occurring within the same CC or cell. Such simultaneous uplink transmissions may occur using different UE panels (e.g., in frequency range two (FR2)), or from different antenna ports. This may result in two PUSCH transmissions being scheduled within the same CC or cell that are associated with the same or with different transmission groups (e.g., control resource set (CORESET) pool index value (CORESETPoolIndex value).

The association between the transmission group (e.g., CORESETPoolIndex value) and the uplink transmission may be signaled or otherwise provided in different ways. In a DG-PUSCH example, the CORESETPoolIndex of the CORESET in which the scheduling DCI is transmitted may be used. In a CG-PUSCH example, the CORESETPoolIndex value of the CG-PUSCH may be configured in RRC signaling as part of the CG configuration or may be based on the activating DCI (e.g., CORESETPoolIndex of the CORESET in which the activation DCI is received) may be used in a Type 2 scenario (e.g., DCI activated CG resources). Generally, the CORESETPoolIndex value may be used for multi-DCI based multi-TRP uplink transmissions. Typical CORESETPoolIndex values may be either 0 or 1, effectively creating two groups (e.g., transmission groups), where each transmission group is associated with a different CORESET-PoolIndex value (which may also serve to distinguish TRPs within the multi-TRP scenario, in some examples).

Accordingly, references to a transmission group herein may generally refer to an uplink transmission that is associated with a particular CORESETPoolIndex value. However, the transmission groups of uplink transmissions defined herein are not limited to different CORESETPoolIn-dex values. Instead, references to transmission groups herein may generally include uplink transmissions that are defined according to a CORESET pool index, an uplink beam, an uplink power control loop index, an antenna port, a timing advance command, a PCell identifier, a SSB, a SRS resource identifier, or any combination thereof. That is, the discussions provided herein are generally based on an association of a PUSCH with a CORESETPoolIndex value.

For example, the CG PUSCH or DG PUSCH may be associated with different transmission groups, where a transmission group may be defined based on the CORESET-PoolIndex. The transmission group may be defined based on an uplink beam group (e.g., determined based on a UE panel ID defining the uplink beam group, determined based on an uplink transmission configuration indicator (TCI) or spatial relation that defines the uplink beam group(s)), or determined based on a sounding reference signal (SRS) resource set identifier (SRI) associated with the PUSCH). The transmission group may be defined based on an uplink power control closed loop index associated with the uplink transmission (e.g., there may be two closed loop indices (0 and 1) for two closed loop power control for different PUSCH transmissions in the same CC or cell). The transmission group may be defined based on the antenna port(s) (such as PUSCH, SRS, or DMRS ports) or the CDM group(s) that the DMRS ports belong to (e.g., PUSCH or SRS ports may be indicated by SRI field in the uplink DCI while the DMRS ports may be determined from an "antenna port(s) field" of an uplink DCI. The transmission group may be defined based on a timing advance command (TAC) group (TAG) identifier (e.g., such as when the two transmission groups have different timing advances for the uplink transmissions). The transmission group may be determined based on the PCI or SSB set associated with the uplink transmission (e.g., the notion of serving cell vs non-serving cell PCI or SSB set may be used for inter-cell multi-TRP). Accordingly, the term transmission group of an uplink transmission may be defined according to a variety of mechanisms and discussions using a CORESETPoolIndex value are presented as non-limiting examples only.

Accordingly, aspects of the techniques described herein generally provide various mechanisms that may be used by UE 205 or network entity 210 when canceling some or all of an uplink transmission that overlaps, at least to some degree, in the time domain with another uplink transmission in the same CC or cell. For example, network entity 210 may transmit or otherwise provide (and UE 205 may receive or otherwise obtain) signaling that schedules a set of uplink transmission that overlap in the time domain (e.g., at least partially). This may include at least one DG based uplink transmission and at least one CG based uplink transmission being scheduled. Each (e.g., some or all) of the uplink transmissions may be associated with a corresponding transmission group of the available transmission groups used for simultaneous serving cell transmissions (e.g., for simultaneous uplink transmissions within a CC).

Network entity 210 may also transmit or otherwise provide (and UE 205 may receive or otherwise obtain) a control message (e.g., higher layer signaling) indicating a prioritization configuration for the set of uplink transmissions overlapping in the time domain. For example, UE 205 may be configured with prioritization configurations according to prioritizationBetweenHP-DG-PUSCHandLP-CG-PUSCH or with prioritizationBetweenLP-DG-PUSCHandHP-CG-PUSCH. UE 205 may be configured with the prioritization configuration separate from (e.g., before or simultaneously with) the signaling scheduling the set of uplink transmissions. Accordingly, UE 205 may cancel some or all (e.g., at least an overlapping portion) of one or more of the uplink transmissions based on the overlap in the time domain, the corresponding transmission group or the prioritization configuration.

Generally, wireless communications system 200 illustrates an example where, within a given CC or cell, UE 205 may not expect to be configured with both simultaneous PUSCH transmissions that overlap in the time domain and is also configured with prioritizationBetweenHP-DG-PUS-CHandLP-CG-PUSCH or with prioritizationBetweenLP-DG-PUSCHandHP-CG-PUSCH prioritization configurations. In some aspects, the prioritization configuration of prioritizationBetweenHP-DG-PUSCHandLP-CG-PUSCH and prioritizationBetweenLP-DG-PUSCHandHP-CG-PUSCH can be per CORESETPoolIndex value within a given CC basis, rather than being configured per CC. This may support CG/DG PUSCHs associated with a first TRP, but not CG/DG PUSCHs associated with a second TRP (e.g., if all PUSCH transmissions to the second TRP are either LP or HP). In the non-limiting examples illustrated in FIG. 2A and FIG. 2B, UE 205 may be configured with prioritizationBetweenHP-DG-PUSCHandLP-CG-PUSCH per CORESETPoolIndex value, and it is enabled just for CORESETPoolIndex value 0.

Turning to wireless communications system 200-a of FIG. 2A, this may include UE 205 and network entity 210 performing wireless communications within a CC or cell. The wireless communications may include network entity 210 transmitting or otherwise providing for output (and UE 205 receiving or otherwise obtaining) DCI 215 that schedules a HP DG based uplink transmission (e.g., HP DG PUSCH 220). Network entity 210 may also transmit or otherwise provide for output (and UE 205 may receive or otherwise obtain) signaling that configures a LP CG based uplink transmission (e.g., LP CG PUSCH 225), which may include the RRC configuration signaling of the CG configuration or a DCI activating the CG configuration to be used for the uplink transmission. Accordingly, the set of uplink transmissions in this case includes at least one DG based uplink transmission and at least one CG based uplink transmission, with both uplink transmissions being associated with the same transmission group (e.g., CORESET-PoolIndex value 0) in this example.

The uplink transmissions may generally overlap in the time domain, at least to some degree. In the non-limiting example illustrated in FIG. 2A, this may include the HP DG based uplink transmission overlapping with the LP CG based uplink in the time domain between time t1 and time t2. Accordingly, UE 205 may cancel some or all (e.g., at least the overlapping portion between time t1 and time t2) of the LP CG based uplink transmission (e.g., LP CG PUSCH 225) based on the priority configuration, the overlap in the time domain, and that both uplink transmissions are within the same transmission group. For example, and in a given CC, the overlapping portion between LP CG PUSCH 225 and HP DG PUSCH 220 may be resolved by canceling the LP CG PUSCH 225 within all PUSCHs that are associated with the same CORESETPoolIndex value. UE 205 may perform the LP CG based uplink transmission (LP CG PUSCH 225) up to the last symbol of the LP CG based uplink transmission (LP CG PUSCH 225) that occurs before the first symbol of the HP DG based uplink transmission or may simply drop the LP CG based uplink transmission (LP CG PUSCH 225). Accordingly, UE 205 may cancel the LP CG PUSCH 225 portion overlapping with HP DG PUSCH 220 before the first symbol overlapping with the HP DG PUSCH 220 if both the LP CG PUSCH 225 and the HP DG PUSCH 220 are associated with the same CORESETPoolIndex value and UE 205 is configured with prioritizationBetweenHP-DG-PUSCHandLP-CG-PUSCH in that CC or cell. In some aspects, the N2+d1+d3 scheduling timeline discussed above may be satisfied for the DCI 215 scheduling the HP DG PUSCH 220.

Turning next to wireless communications system 200-*b* of FIG. 2B, wireless communications between UE 205 and network entity 210 may include network entity 210 transmitting or otherwise providing for output (and UE 205 receiving or otherwise obtaining) DCI 230 that schedules a DG based uplink transmission (e.g., DG PUSCH 235). Network entity 210 may also transmit or otherwise provide for output (and UE 205 may receive or otherwise obtain) signaling that configures a CG based uplink transmission (e.g., CG PUSCH 240), which may include the RRC configuration signaling of the CG configuration or a DCI activating the CG configuration to be used for the uplink transmission. The set of uplink transmissions in this example includes at least one DG based uplink transmission (DG PUSCH 235) and at least one CG based uplink transmission (CG PUSCH 240), with both uplink transmissions being associated with the same transmission group (e.g., CORESETPoolIndex value 1) for which the prioritization configuration "prioritizationBetweenHP-DG-PUSCHandLP-CG-PUSCH" is not enabled.

The uplink transmissions may generally overlap in the time domain, at least to some degree. In the non-limiting example illustrated in FIG. 2B, this may include the DG based uplink transmission (DG PUSCH 235) overlapping with the CG based uplink transmission (CG PUSCH 240) in the time domain between time t1 and time t2. Because both uplink transmissions are associated with CORESETPoolIndex value 1 and because "prioritizationBetweenHP-DG-PUSCHandLP-CG-PUSCH" is not enabled for CORESETPoolIndex value 1 in this example, UE 205 may revert to a default or legacy behavior and simply drop the CG based uplink transmission (CG PUSCH 240) if DCI 230 is received N2 or more symbols before the start of the CG based uplink transmission (CG PUSCH 240).

As discussed above, the association of the CG based uplink transmission (CG PUSCH 240) and the CORESETPoolIndex value may be based on a default CORESETPoolIndex value (e.g., 0), which may result in all CG PUSCHs being associated with one or more of the first CORESETPoolIndex value, the first TRP, or the first UE panel. This association may be provided via RRC signaling of the CG configuration used for the CG based uplink transmission (CG PUSCH 240). The association may be based on the DCI activating the CG configuration with the CORESETPoolIndex value (e.g., for Type 2 CG).

As discussed above, in some examples the prioritization configuration may be configured on a per CC or cell basis (e.g., not on a per-transmission group or CORESETPoolIndex value basis). In some examples, the prioritization configuration may be configured on a per CC or cell basis and on a per transmission group or CORESETPoolIndex value basis. Accordingly, in some examples the prioritization configuration may be configured for one CC or cell and not for another CC or cell. As one non-limiting example, the prioritization configuration "prioritizationBetweenHP-DG-PUSCHandLP-CG-PUSCH" may not be configured for the CC or cell of the at least one DG based uplink transmission (e.g., DG PUSCH 235) and the CG based uplink transmission (CG PUSCH 240). In this example, UE 205 may drop the CG based uplink transmission rather than cancel a portion of the CG based uplink transmission. Moreover, in this example the N2 scheduling timeline may be applied with respect to cancelling the CG based uplink transmission (CG PUSCH 240), and the UE 205 may adopt default or legacy conflict resolution behavior for transmission group(s) within the set of uplink transmissions that are not configured with a prioritization configuration.

In situations where the prioritization configuration "prioritizationBetweenHP-DG-PUSCHandLP-CG-PUSCH" is enabled for CORESETPoolIndex 1 or a CC or cell associated with both DG PUSCH 235 and CG PUSCH 240, the physical layer prioritization shown in FIG. 2A may apply. In such an example, DG PUSCH 235 may be considered a HP-DG-PUSCH and CG PUSCH 240 may be considered a LP-CG-PUSCH, and UE 205 may cancel the overlapping portion of the CG based uplink transmission (e.g., rather than drop the entire CG based uplink transmissions).

Accordingly, UE 205 may cancel the overlapping portion of the uplink transmission (or drop completely in some examples) having the lowest priority level within the same transmission group when the overlapping uplink transmissions are scheduled within the same transmission group.

Figure 3A:
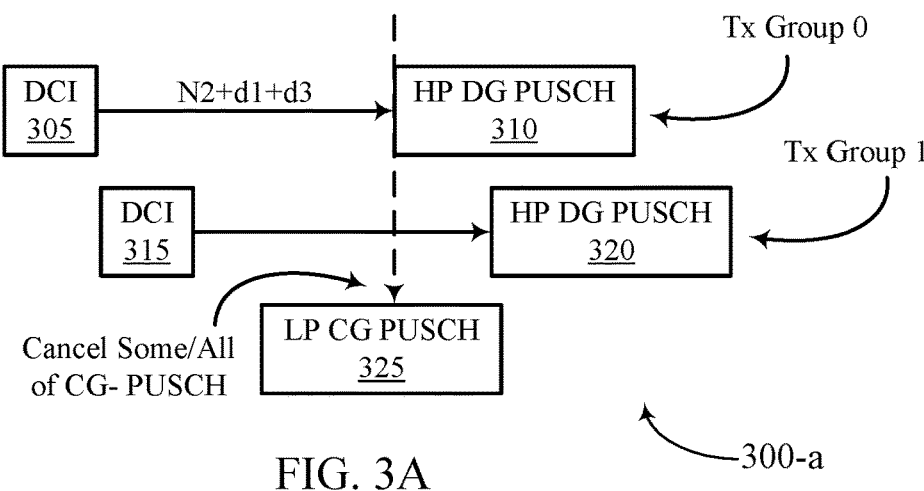
FIGS. 3A to 3C illustrate examples of a prioritization configuration that supports prioritization for simultaneous uplink transmissions in accordance with one or more aspects of the present disclosure.
Figure 3B:
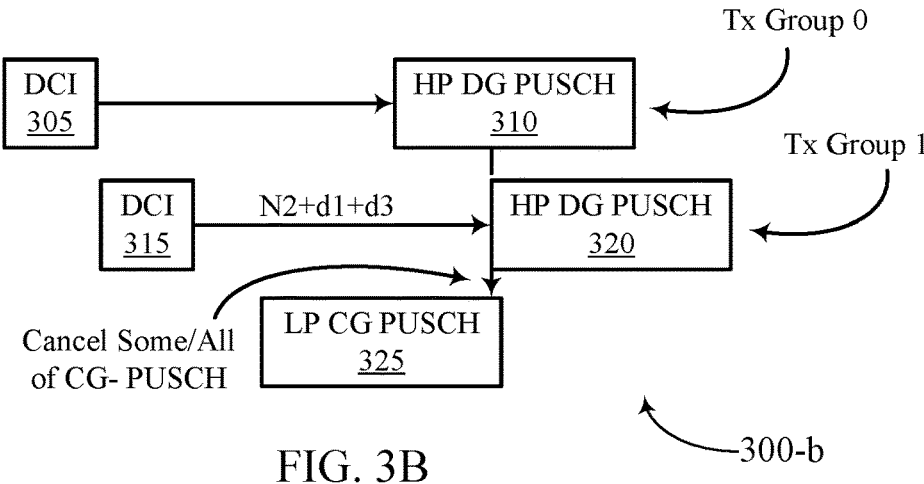
Figure 3C:
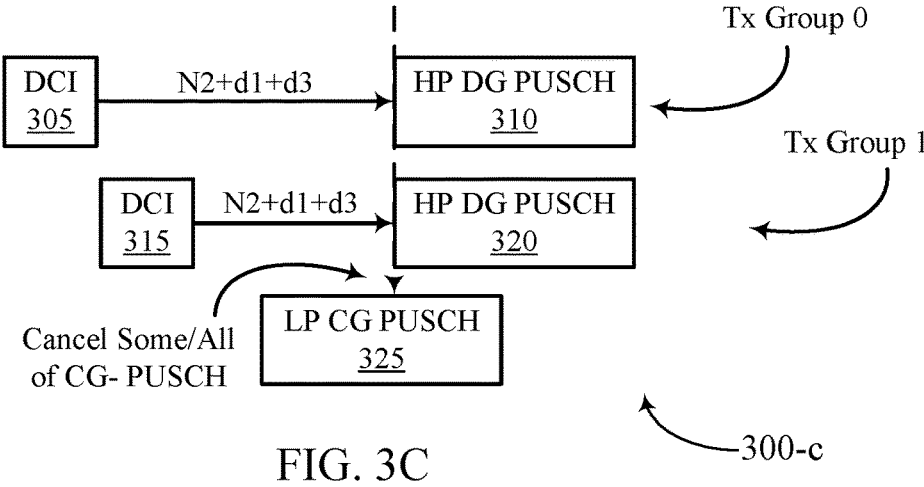

FIGS. 3A-3C illustrate examples of a prioritization configuration 300 that supports prioritization for simultaneous uplink transmissions in accordance with one or more aspects of the present disclosure. Prioritization configuration 300 may implement aspects of wireless communications systems 100 or 200. Aspects of prioritization configuration 300 may be implemented at or implemented by a UE or network entity, which may be examples of the corresponding devices described herein. Prioritization configuration 300 illustrates a non-limiting example where the CG PUSCH is not associated with a CORESETPoolIndex value (e.g., either explicitly or implicitly). In this configuration, two overlapping CG based uplink transmissions may not be transmitted simultaneously. However, the UE is configured with two HP DG based uplink transmissions that are associated with different transmission groups.

As discussed above, aspects of the techniques described herein provide various mechanisms where a UE is configured to cancel some or all (e.g., at least an overlapping portion) of an uplink transmission that overlaps with another uplink transmission within a CC or cell. For example, the UE may receive or otherwise obtain signaling that schedules a set of uplink transmissions that at least partially overlap in the time domain. For example, the set of uplink transmissions may include at least one DG based uplink transmission and at least one CG based uplink transmission. In some examples, some or each uplink transmission being associated with a transmission group for simultaneous serving cell transmissions (e.g., for simultaneous uplink transmissions within a CC or cell).

Turning to prioritization configuration 300-*a* of FIG. 3A, the signaling may include DCI 305 scheduling a first HP DG based uplink transmission (e.g., HP DG PUSCH 310) within a first transmission group (e.g., transmission group 0), DCI 315 scheduling a second HP DG based uplink transmission (e.g., HP DG PUSCH 320) associated with a second transmission group (e.g., transmission group 1). The signaling may also include RRC signaling indicating a CG configuration to be used for a LP CG based uplink transmission (e.g., LP CG PUSCH 325) or the activation DCI activating the CG configuration). The UE may also receive or otherwise obtain a control message (e.g., higher layer signaling) indicating a prioritization configuration (e.g., a prioritizationBetweenHP-DG-PUSCHandLP-CG-PUSCH). Accordingly, the UE may cancel at least an overlapping portion of one uplink transmission from the set of uplink transmissions based on the overlap, the transmission group, or the prioritization configuration.

For example, in the non-limiting example illustrated in FIG. 3A the UE may cancel at least the overlapping portion of the CG based uplink transmission (e.g., rather than canceling the two DG based uplink transmissions that are associated with different transmission groups). FIG. 3A illustrates an example where the UE cancels the overlapping portion of the CG based uplink transmission (e.g., LP CG PUSCH 325) prior to the first symbol of the first DG based uplink transmission (e.g., HP DG PUSCH 310). For example, if the first symbol overlapping with the first HP DG based uplink transmission is earlier than the first symbol overlapping with the second HP DG based uplink transmission, prioritization configuration 300-*a* of FIG. 3A illustrates an example where the UE cancels the LP CG PUSCH 325 before the first symbol overlapping with the first HP DG PUSCH (e.g., the earliest HP DG based uplink transmission with an overlapping symbol). In this example, the N2+d1+ d3 scheduling timeline discussed above may be followed with respect to DCI 305 and HP DG PUSCH 310.

Prioritization configuration 300-*b* of FIG. 3B illustrates an example where the UE cancels the overlapping portion of the CG based uplink transmission prior to a first symbol of the CG based uplink transmission that overlaps with the first symbol of the second DG based uplink transmission (e.g., prior to the first symbol of HP DG PUSCH 320). That is, in this example the UE may cancel the LP CG based uplink transmission (e.g., LP CG PUSCH 325) before the first symbol overlapping with the second HP DG based uplink transmission (e.g., the HP DG based uplink transmission with the later first overlapping symbol). In this example, the N2+d1+d3 scheduling timeline discussed above may be followed with respect to DCI 315 and HP DG PUSCH 320.

Prioritization configuration 300-*c* of FIG. 3C illustrated an example where both HP DG based uplink transmissions (e.g., HP DG PUSCH 310 and HP DG PUSCH 320) begin at the same time. In this situation, the UE may cancel the overlapping portion of the CG based uplink transmission (e.g., LP CG PUSCH 325) prior to the first symbol of the CG based uplink transmission that overlaps with both the first DG based uplink transmission (e.g., HP DG PUSCH 310) and the second DG based uplink transmission (e.g., HP DG PUSCH 320). That is, in the situation where the first symbol overlapping with the first HP DG based uplink transmission is the same as the first symbol of the second HP DG based uplink transmission, the UE may cancel the LP CG based uplink transmission before the first symbol overlapping with the first or second HP DG based uplink transmission. In some examples, the N2+d1+d3 scheduling timeline discussed above may be followed with respect to both of DCI 305 and HP DG PUSCH 310 and with respect to DCI 315 and HP DG PUSCH 320, or with respect to either DCI 305 and HP DG PUSCH 310, or with respect to DCI 315 and HP DG PUSCH 320.

Accordingly, the UE may identify, calculate, or otherwise determine the starting symbol of the first DG based uplink transmission (e.g., a first starting symbol) or the starting symbol of the second DG based uplink transmission (e.g., a second starting symbol). The UE may use or otherwise apply the starting symbol of the CG based uplink transmission in combination with the first or second starting symbols to determine when to cancel some or all (e.g., at least the overlapping portion) of the CG based uplink transmission.

Figure 4A:
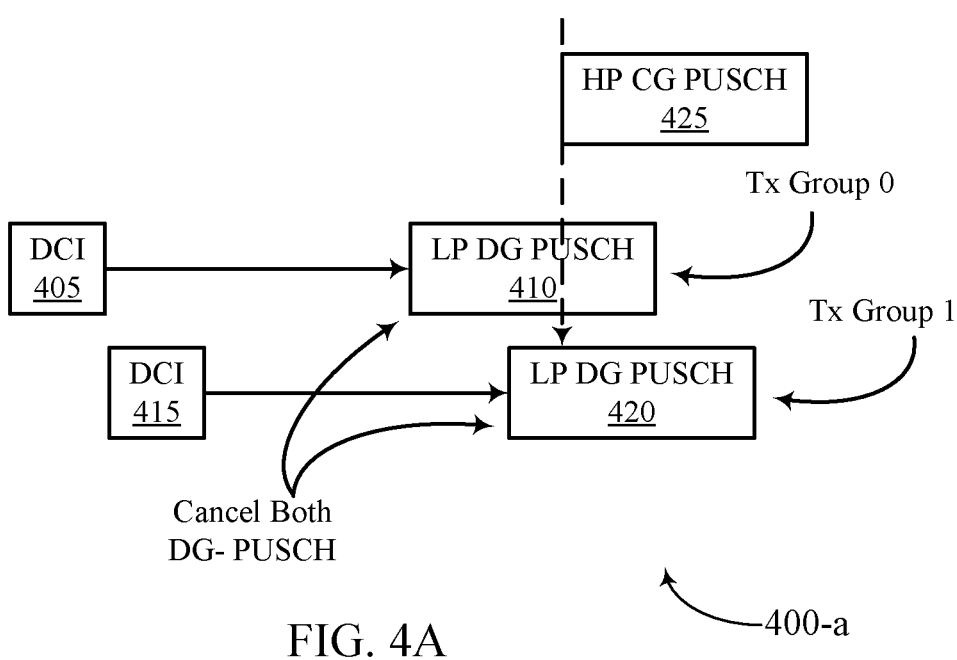
FIGS. 4A and 4B illustrate examples of a prioritization configuration that supports prioritization for simultaneous uplink transmissions in accordance with one or more aspects of the present disclosure.
Figure 4B:
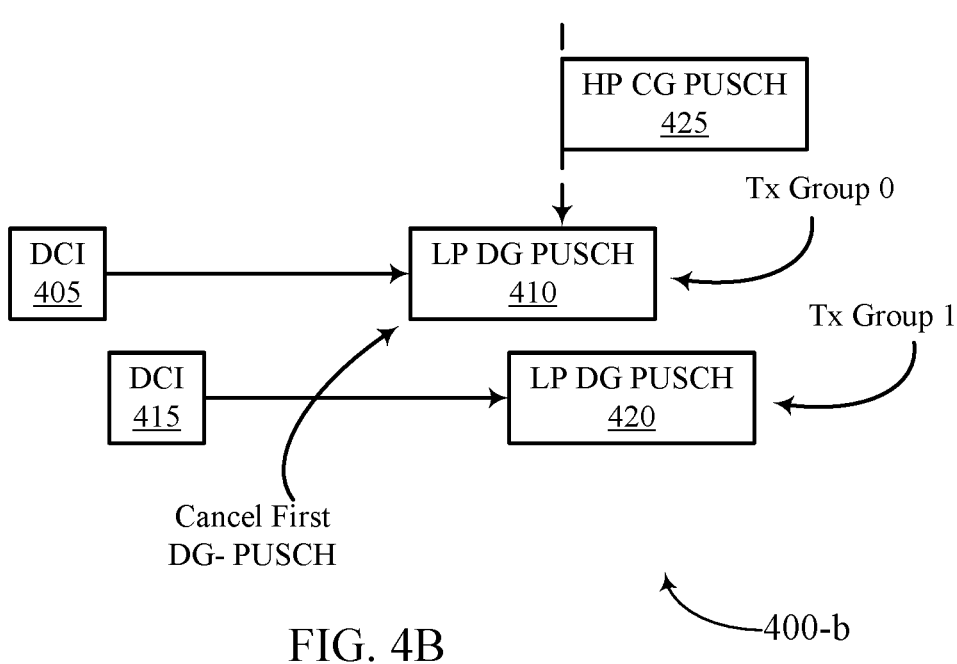

FIGS. 4A-4B illustrate examples of a prioritization configuration 400 that supports prioritization for simultaneous uplink transmissions in accordance with one or more aspects of the present disclosure. Prioritization configuration 400 may implement aspects of wireless communications systems 100 or 200. Aspects of prioritization configuration 400 may be implemented at or implemented by a UE or network entity, which may be examples of the corresponding devices described herein. Prioritization configuration 400 illustrates a non-limiting example where the CG PUSCH is not associated with a CORESETPoolIndex value (e.g., either explicitly or implicitly). In this configuration, two overlapping CG based uplink transmissions may not be configured. However, the UE is configured with two LP DG based uplink transmissions that are associated with different transmission groups (e.g., transmission (Tx) groups 0 and 1).

As discussed above, aspects of the techniques described herein provide various mechanisms where a UE is configured to cancel some or all (e.g., at least an overlapping portion) of an uplink transmission that overlaps with another uplink transmission within a CC or cell. For example, the UE may receive or otherwise obtain signaling that schedules a set of uplink transmissions that at least partially overlap in the time domain. For example, the set of uplink transmissions may include at least one DG based uplink transmission and at least one CG based uplink transmission. In some examples, some or each (e.g., at least two, or more) uplink transmission being associated with a transmission group for simultaneous serving cell transmissions (e.g., for simultaneous uplink transmissions within a CC or cell).

Turning to prioritization configuration 400-*a* of FIG. 4A, the signaling may include DCI 405 scheduling a first LP DG based uplink transmission (e.g., LP DG PUSCH 410) within a first transmission group (e.g., transmission group 0), DCI 415 scheduling a second LP DG based uplink transmission (e.g., LP DG PUSCH 420) associated with a second transmission group (e.g., transmission group 1). The signaling may also include RRC signaling indicating a CG configuration to be used for a HP CG based uplink transmission (e.g., HP CG PUSCH 425) or the activation DCI activating the CG configuration). The UE may also receive or otherwise obtain a control message (e.g., higher layer signaling) indicating a prioritization configuration (e.g., a prioritizationBetweenLP-DG-PUSCHandHP-CG-PUSCH). Accordingly, the UE may cancel at least an overlapping portion of one uplink transmission from the set of uplink transmissions based on the overlap, the transmission group, or the prioritization configuration.

For example, in the non-limiting example illustrated in FIG. 4A the UE may cancel at least the overlapping portion of one or both of the DG based uplink transmission. FIG. 4A illustrates an example where the UE cancels some or all (e.g., at least the overlapping portions) of the DG based uplink transmissions (e.g., LP DG PUSCH 410 and LP DG PUSCH 420) prior to the first symbol of the CG based uplink transmission (e.g., HP CG PUSCH 425). That is and within a given CC or cell, when the HP CG PUSCH 425 overlaps with both the first LP DG PUSCH 410 associated with a first transmission group 0 (e.g., CORESETPoolIndex value=0) and the second LP DG PUSCH 420 associated with a second transmission group 1 (e.g., CORESETPoolIndex value=1) and the UE is configured with prioritizationBetweenLP-DG-PUSCHandHP-CG-PUSCH (e.g., the prioritization configuration indicates that the HP CG based uplink transmission is prioritized over the LP DG based uplink transmission), the UE may cancel some or all of one or both of the LP DG based uplink transmissions. For example, the UE may cancel one or both of the LP DG based uplink transmissions prior to the first symbol that overlaps with the HP CG based uplink transmission.

Prioritization configuration 400-b of FIG. 4B illustrates an example where the UE cancels the overlapping portion of one of the LP DG based uplink transmissions prior to a first symbol of the CG based uplink transmission that overlaps with the first symbol of the LP DG based uplink transmission (e.g., prior to the first symbol of HP CG PUSCH 425). That is, in this example the UE may cancel the first LP DG based uplink transmission (e.g., LP DG PUSCH 410) before the first symbol overlapping with the HP CG based uplink transmission (e.g., the HP DG based uplink transmission with the earliest first overlapping symbol, in this example).

However, in other examples the UE may cancel some or all of the second LP DG based uplink transmission. That is, the UE may choose between canceling the first LP DG based uplink transmission or the second LP DG based uplink transmission according to various techniques. One technique may include the UE canceling the LP DG based uplink transmission associated with a fixed CORESETPoolIndex value (e.g., CORESETPoolIndex value=0, which may correspond to transmission group=0). Another technique may include the UE canceling the LP DG based uplink transmission that starts or ends first (e.g., an earliest start time or an earliest end time). Another technique may include the UE canceling the LP DG based uplink transmission that starts or ends last (e.g., a latest starting time or a latest ending time). Another technique may include the UE canceling the LP DG based uplink transmission having a shorter or longer duration (e.g., the duration of each LP DG based uplink transmission). Another technique may include the UE canceling the LP DG based uplink transmission having the smaller or larger number of overlapping symbols with the HP CG based uplink transmission (e.g., a number of overlapping symbols). Another technique may include the UE canceling the LP DG based uplink transmission having a smaller or larger modulation and coding scheme (MCS). Any of such techniques may be considered or otherwise applied by the UE when identifying, selecting, or otherwise determining which of the two LP DG based uplink transmissions to cancel.

Accordingly, the UE may cancel some or all of the LP DG based uplink transmissions and perform the HP CG based uplink transmission based at least in part on the overlap in the time domain, the transmission group(s) associated with some or all of the uplink transmissions, and the prioritization configuration.

Figure 5:
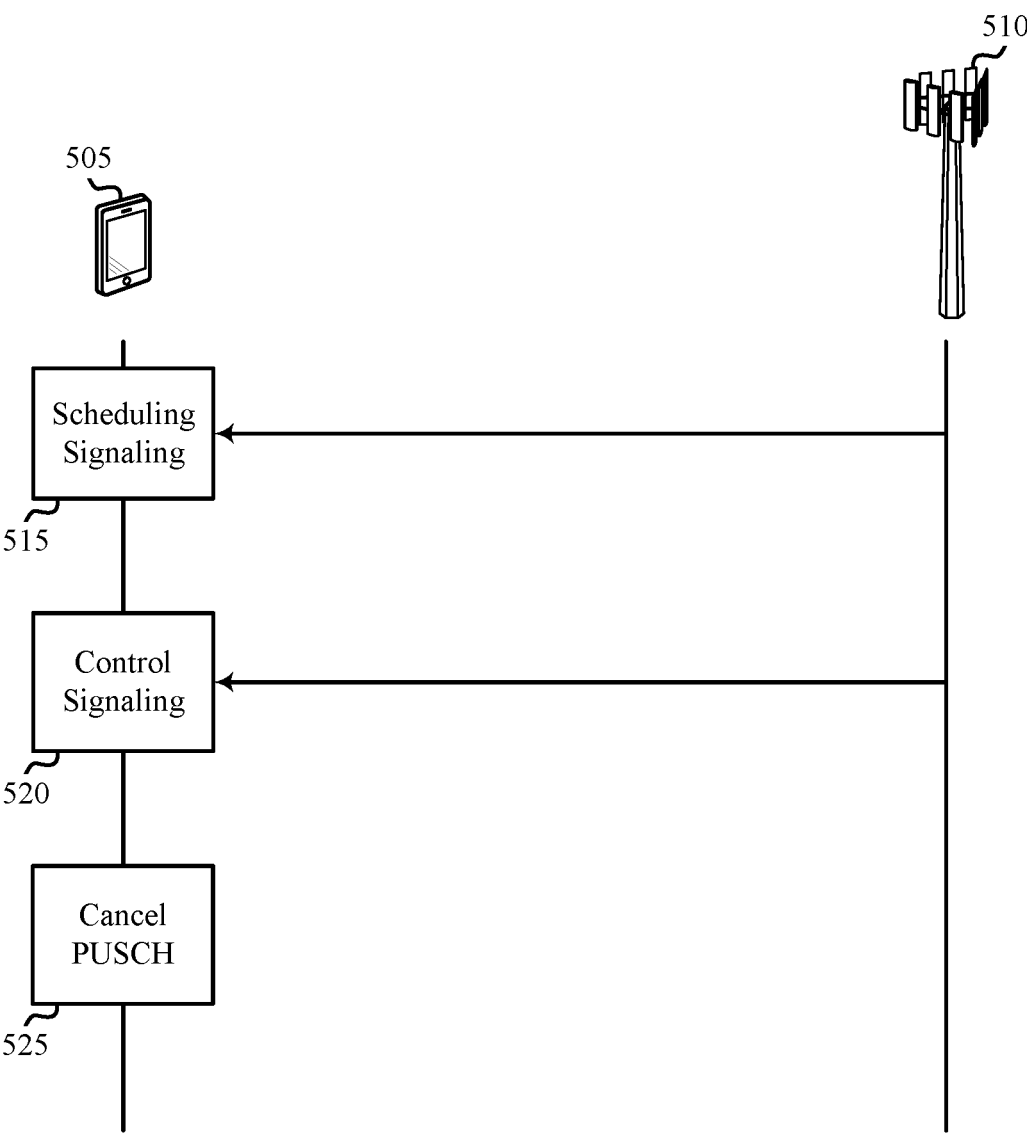
FIG. 5 illustrates an example of a method that supports prioritization for simultaneous uplink transmissions in accordance with one or more aspects of the present disclosure.

FIG. 5 illustrates an example of a method 500 that supports prioritization for simultaneous uplink transmissions in accordance with one or more aspects of the present disclosure. Method 500 may implement aspects of wireless communications systems 100 or 200 or aspects of prioritization configurations 300 or 400. Aspects of method 500 may be implemented at or implemented by UE 505 or network entity 510, which may be examples of the corresponding devices described herein.

At 515, network entity 510 may transmit or otherwise provide for output (and UE 505 may receive or otherwise obtain) scheduling signaling. In some examples, the scheduling signaling may schedule wireless communications for UE 505. In some examples, the scheduling signaling may schedule a set (e.g., one or more) of transmissions to or from UE 505 (e.g., uplink transmissions or downlink transmissions). In some examples, the scheduling signaling may schedule at least one DG based uplink transmission. In some examples, the scheduling signaling may schedule at least one CG based uplink transmission. In some examples, a set (e.g., one or more) of uplink transmissions may include uplink transmission(s) associated with corresponding transmission groups. In some examples, the uplink transmission(s) in the set of uplink transmissions may be associated with the same transmission group. In some examples, the uplink transmission(s) in the set of uplink transmissions may be associated with different transmission groups. In some examples, the corresponding transmission group(s) of the uplink transmissions may be based, at least to some degree, on simultaneous serving cell transmissions (e.g., uplink transmissions within a CC or cell).

In some examples, the transmission group of each (e.g., none, one, some or all) uplink transmissions may be defined according to any combination of an associated CORESET-PoolIndex, uplink beam, uplink power control loop index, antenna port, timing advance command, PCell ID, or SSB.

In some examples, the scheduling signaling may include a DCI scheduling a DG based uplink transmission. In some examples, the scheduling signaling may include RRC signaling or MAC CE signaling configuring a CG configuration for the UE to use for a CG based uplink transmission. In some examples, the control signaling may include a DCI activating a CG configuration to be used for a CG based uplink transmission.

At 520, network entity 510 may transmit or otherwise provide for output (and UE 505 may receive or otherwise obtain) control signaling. In some examples, the control signaling may include one or more control messages. In some examples, the one or more control messages may indicate or otherwise identify (explicitly or implicitly) a prioritization configuration for the set of uplink transmissions. In some examples, the prioritization configuration may be based on an overlap of two or more uplink transmissions in the time domain. In some examples, the prioritization configuration may indicate that a HP DG based uplink transmission is prioritized over a LP CG based uplink transmission (e.g., prioritizationBetweenHP-DG-PUSCHandLP-CG-PUSCH). In some examples, the prioritization configuration may indicate that a HP CG based uplink transmission is prioritized over a LP DG based uplink transmission (e.g., prioritizationBetweenLP-DG-PUSCHandHP-CG-PUSCH).

At 525, UE 505 may cancel an uplink transmission. In some examples, the UE may cancel one or more uplink transmissions in the set of uplink transmissions. In some examples, the UE may cancel at least an overlapping portion of the one or more uplink transmissions. In some examples, the UE may cancel (e.g., drop) the one or more uplink transmissions. In some examples, the UE may cancel some or all of the one or more uplink transmissions based on the transmission group of each uplink transmission, when applicable. In some examples, the UE may cancel some or all of the one or more uplink transmissions based on the prioritization configuration (when configured). In some examples, the UE may cancel some or all of the one or more uplink transmissions based on the overlap (e.g., at least the partial overlap) in the time domain.

In some examples, this may include the UE canceling the uplink transmission(s) with the lowest priority level (e.g., LP vs HP) within the same transmission group within a CC or cell (e.g., canceling a LP CG/DG PUSCH that overlaps with a HP DG/CG PUSCH).

In some examples, this may include the UE canceling a CG based uplink transmission that overlaps with two or more DG based uplink transmissions when the two or more DG based uplink transmissions are associated with different transmission groups. In some examples, this may include the UE canceling one or more of the two or more DG based uplink transmissions.

Figure 6:
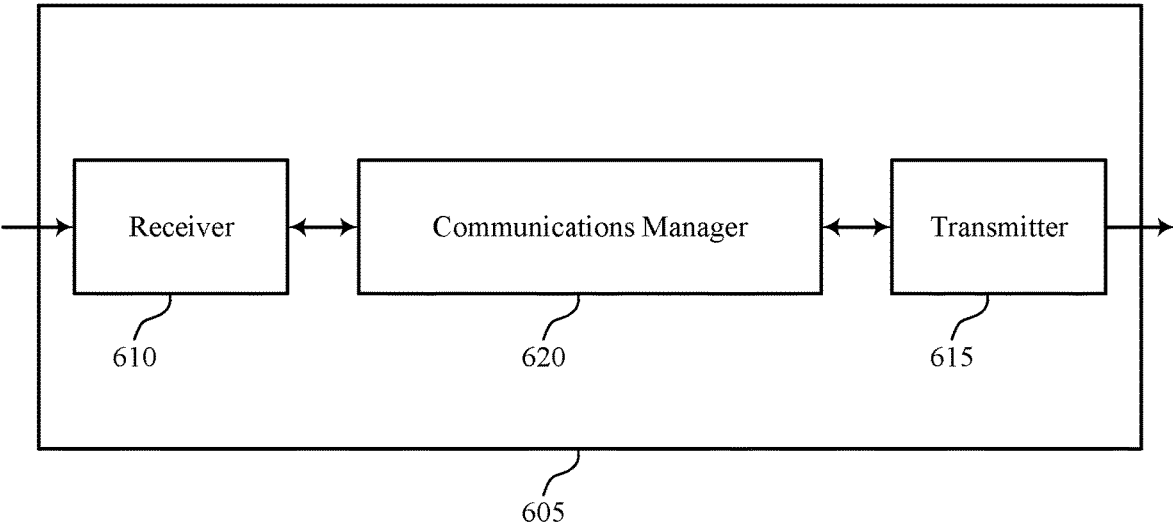
FIGS. 6 and 7 show block diagrams of devices that support prioritization for simultaneous uplink transmissions in accordance with one or more aspects of the present disclosure.
Figure 6:

FIG. 6 shows a block diagram 600 of a device 605 that supports prioritization for simultaneous uplink transmissions in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to prioritization for simultaneous uplink transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to prioritization for simultaneous uplink transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of prioritization for simultaneous uplink transmissions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry), software (e.g., executed by a processor), or any combination thereof. The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The communications manager 620 may be configured as or otherwise support a means for receiving a control message indicating a prioritization configuration for the set of uplink transmissions that at least partially overlap in the time domain. The communications manager 620 may be configured as or otherwise support a means for canceling at least an overlapping portion of one uplink transmission in the set of uplink transmissions based on the at least partial overlap in the time domain, the corresponding transmission group, and the prioritization configuration.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for a UE to cancel some or all of one or more uplink transmissions within a serving cell or CC based on an overlap in the time domain, the transmission group of the overlapping uplink transmissions, and a prioritization configuration between DG and CG based uplink transmissions.

Figure 7:
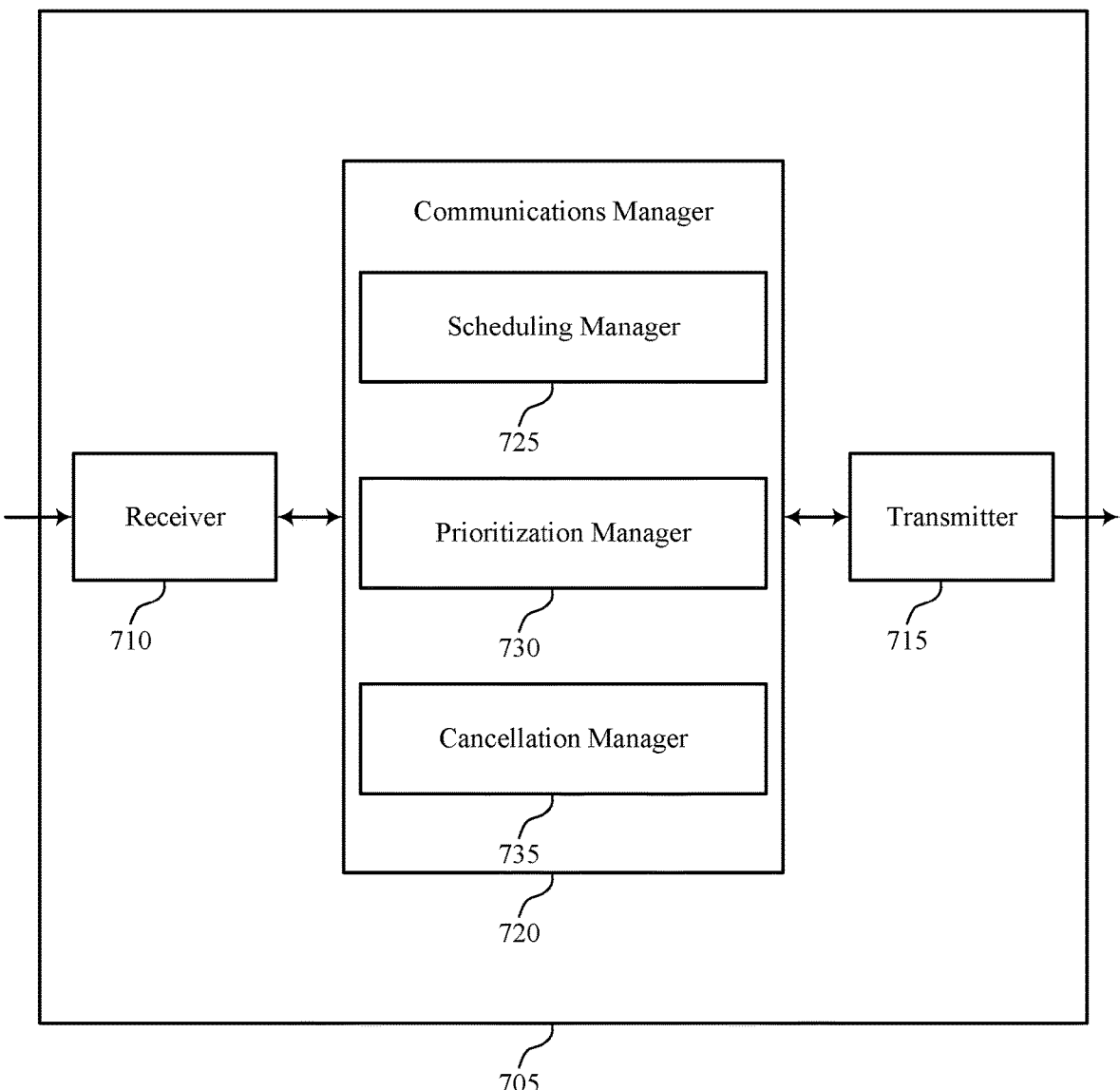

FIG. 7 shows a block diagram 700 of a device 705 that supports prioritization for simultaneous uplink transmissions in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to prioritization for simultaneous uplink transmissions). Information may be passed on to other components of the device 705. The receiver 710 may utilize a single antenna or a set of multiple antennas.

The transmitter 715 may provide a means for transmitting signals generated by other components of the device 705.

For example, the transmitter 715 may transmit information such as packets, user data, control information, or any combination thereof associated with various information channels (e.g., control channels, data channels, information channels related to prioritization for simultaneous uplink transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of prioritization for simultaneous uplink transmissions as described herein. For example, the communications manager 720 may include a scheduling manager 725, a prioritization manager 730, a cancellation manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The scheduling manager 725 may be configured as or otherwise support a means for receiving signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The prioritization manager 730 may be configured as or otherwise support a means for receiving a control message indicating a prioritization configuration for the set of uplink transmissions that at least partially overlap in the time domain. The cancellation manager 735 may be configured as or otherwise support a means for canceling at least an overlapping portion of one uplink transmission in the set of uplink transmissions based on the at least partial overlap in the time domain, the corresponding transmission group, and the prioritization configuration.

Figure 8:
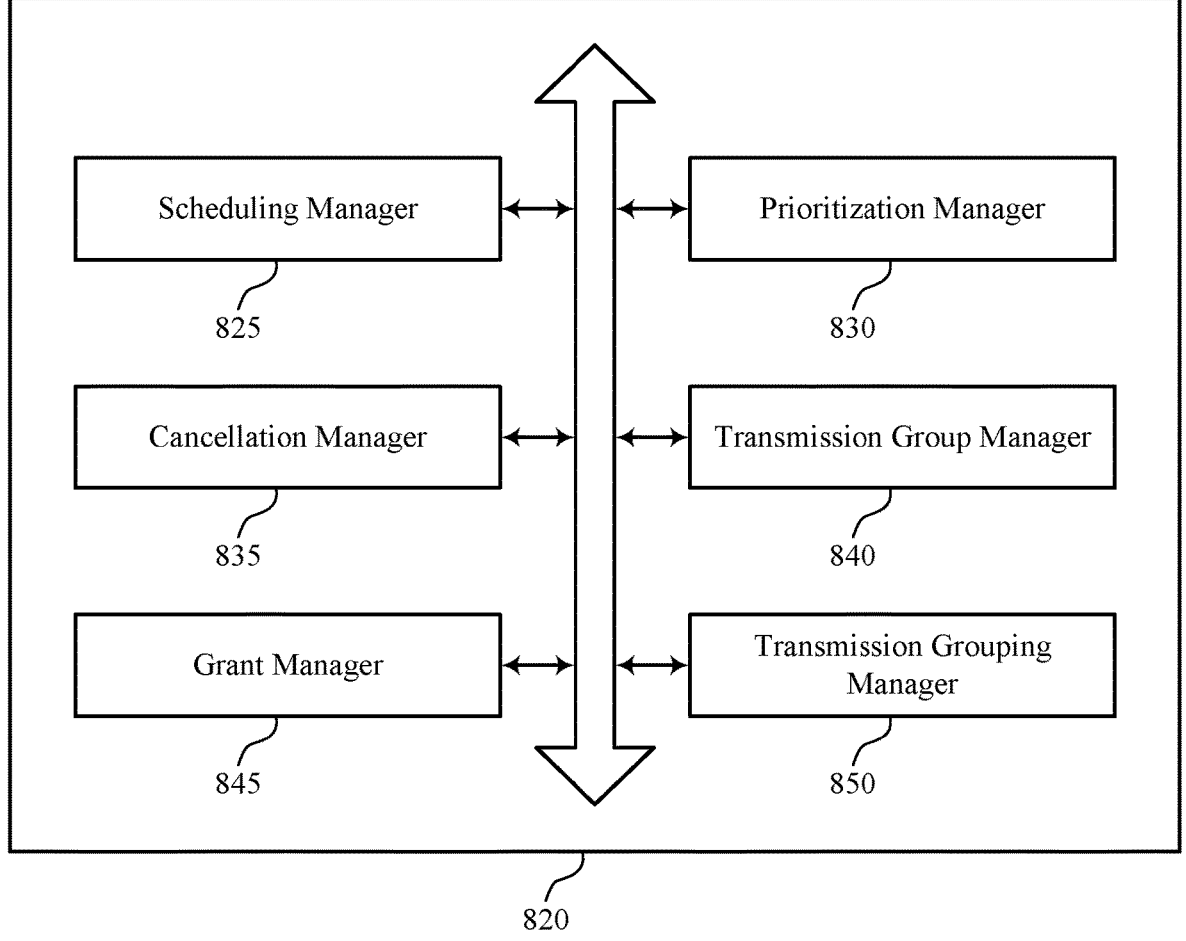
FIG. 8 shows a block diagram of a communications manager that supports prioritization for simultaneous uplink transmissions in accordance with one or more aspects of the present disclosure.

FIG. 8 shows a block diagram 800 of a communications manager 820 that supports prioritization for simultaneous uplink transmissions in accordance with one or more aspects of the present disclosure. The communications manager 820 may be an example of aspects of a communications manager 620, a communications manager 720, or both, as described herein. The communications manager 820, or various components thereof, may be an example of means for performing various aspects of prioritization for simultaneous uplink transmissions as described herein. For example, the communications manager 820 may include a scheduling manager 825, a prioritization manager 830, a cancellation manager 835, a transmission group manager 840, a grant manager 845, a transmission grouping manager 850, or any combination thereof. Each of these components may communicate, directly or indirectly, with one another (e.g., via one or more buses).

The communications manager 820 may support wireless communication at a UE in accordance with examples as disclosed herein. The scheduling manager 825 may be configured as or otherwise support a means for receiving signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The prioritization manager 830 may be configured as or otherwise support a means for receiving a control message indicating a prioritization configuration for the set of uplink transmissions that at least partially overlap in the time domain. The cancellation manager 835 may be configured as or otherwise support a means for canceling at least an overlapping portion of one uplink transmission in the set of uplink transmissions based on the at least partial overlap in the time domain, the corresponding transmission group, and the prioritization configuration.

In some examples, to support canceling at least the overlapping portion of one uplink transmission in the set of uplink transmissions, the transmission group manager 840 may be configured as or otherwise support a means for canceling, within a component carrier associated with the set of uplink transmissions, at least the overlapping portion of the one uplink transmission, where the one uplink transmission is associated with a lowest priority within a same transmission group of the set of uplink transmissions.

In some examples, the one uplink transmission includes a low priority configured grant based uplink transmission and a remaining uplink transmission of the set of uplink transmissions includes a high priority dynamic grant based uplink transmission, the one uplink transmission and the remaining uplink transmission associated with the same transmission group. In some examples, the prioritization configuration indicates that the high priority dynamic grant based uplink transmission is prioritized over the low priority configured grant based uplink transmission.

In some examples, the one uplink transmission includes a low priority dynamic grant based uplink transmission and a remaining uplink transmission of the set of uplink transmissions includes a high priority configured grant based uplink transmission, the one uplink transmission and the remaining uplink transmission associated with the same transmission group. In some examples, the prioritization configuration indicates that the high priority configured grant based uplink transmission is prioritized over the low priority dynamic grant based uplink transmission. In some examples, a default transmission group for configured grant based uplink transmissions, a received indication of the transmission group of the at least one configured grant based uplink transmission, or a transmission group of received downlink control information that activates the at least one configured grant based uplink transmission. In some examples, the prioritization configuration is configured on a per-transmission group basis.

In some examples, to support canceling at least the overlapping portion of one uplink transmission in the set of uplink transmissions, the grant manager 845 may be configured as or otherwise support a means for canceling, within a component carrier associated with the set of uplink transmissions, at least the overlapping portion of the at least one configured grant based uplink transmission that is different from at least two uplink transmissions within the set of uplink transmissions, where the at least two uplink transmissions are associated with different transmission groups and are dynamic grant based uplink transmissions.

In some examples, to support canceling at least the overlapping portion of one uplink transmission in the set of uplink transmissions, the grant manager 845 may be configured as or otherwise support a means for canceling at least the overlapping portion of the at least one configured grant based uplink transmission prior to a first symbol of the at least one configured grant based uplink transmission that overlaps with a first dynamic grant based uplink transmission, with a second dynamic grant based uplink transmission, or a combination thereof, in the at least two uplink transmissions.

In some examples, the grant manager 845 may be configured as or otherwise support a means for determining a first starting symbol of the first dynamic grant based uplink transmission and a second starting symbol of the second dynamic grant based uplink transmission. In some examples, the grant manager 845 may be configured as or otherwise support a means for identifying the first symbol of the at least one configured grant based uplink transmission that overlaps with the first dynamic grant based uplink transmission, the second dynamic grant based uplink transmission, or the combination thereof, based on the first starting symbol or the second starting symbol.

In some examples, to support canceling at least the overlapping portion of one uplink transmission in the set of uplink transmissions, the grant manager 845 may be configured as or otherwise support a means for canceling, within a component carrier associated with the set of uplink transmissions, at least the overlapping portion of a dynamic grant based uplink transmission from at least two uplink transmissions within the set of uplink transmissions, where the at least two uplink transmissions are associated with different transmission groups and the dynamic grant based uplink transmission includes a low priority uplink transmission. In some examples, the prioritization configuration indicates that a high priority configured grant based uplink transmission is prioritized over a low priority dynamic grant based uplink transmission.

In some examples, to support canceling at least the overlapping portion of one uplink transmission in the set of uplink transmissions, the grant manager 845 may be configured as or otherwise support a means for canceling at least the overlapping portion of a first dynamic grant based uplink transmission, a second dynamic grant based uplink transmission, or a combination thereof, of at least two uplink transmissions of the set of uplink transmission prior to a first symbol of the corresponding dynamic grant based uplink transmission that overlaps with the at least one configured grant based uplink transmission in the set of uplink transmissions, where the at least one configured grant based uplink transmission includes a high priority uplink transmission.

In some examples, to support canceling at least the overlapping portion of one uplink transmission in the set of uplink transmissions, the grant manager 845 may be configured as or otherwise support a means for canceling at least the overlapping portion of the first dynamic grant based uplink transmission or the second dynamic grant based uplink transmission based on one or more of a transmission group, an earliest start time, an earliest end time, a latest start time, a latest end time, a duration, a number of overlapping symbols, a modulation and coding scheme, or a combination thereof, of the first dynamic grant based uplink transmission, the second dynamic grant based uplink transmission, or both. In some examples, a control resource set pool index, an uplink beam, an uplink power control loop index, an antenna port, a timing advance command, a physical cell identifier, a synchronization signal block, a sounding reference signal resource identifier, or a combination thereof.

Figure 9:
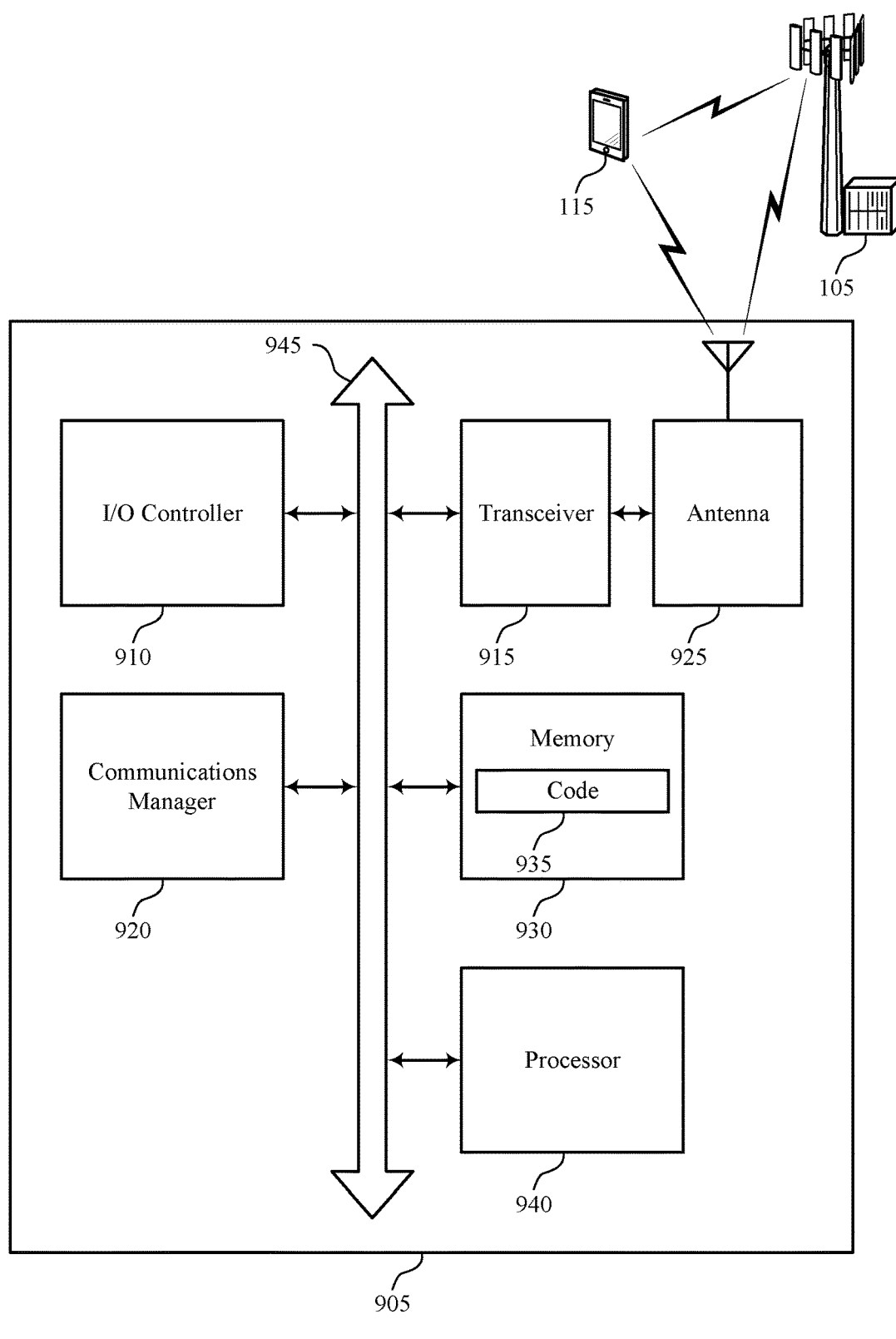
FIG. 9 shows a diagram of a system including a device that supports prioritization for simultaneous uplink transmissions in accordance with one or more aspects of the present disclosure.

FIG. 9 shows a diagram of a system 900 including a device 905 that supports prioritization for simultaneous uplink transmissions in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting prioritization for simultaneous uplink transmissions). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The communications manager 920 may be configured as or otherwise support a means for receiving a control message indicating a prioritization configuration for the set of uplink transmissions that at least partially overlap in the time domain. The communications manager 920 may be configured as or otherwise support a means for canceling at least an overlapping portion of one uplink transmission in the set of uplink transmissions based on the at least partial overlap in the time domain, the corresponding transmission group, and the prioritization configuration.

By including or configuring the communications manager 920 in accordance with examples as described herein, the device 905 may support techniques for a UE to cancel some or all of one or more uplink transmissions within a serving cell or CC based on an overlap in the time domain, the transmission group of the overlapping uplink transmissions, and a prioritization configuration between DG and CG based uplink transmissions.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 (e.g., directly, indirectly, after pre-processing, without pre-processing) to cause the device 905 to perform various aspects of prioritization for simultaneous uplink transmissions as described herein, or the processor 940 and the memory 930 may be otherwise configured to perform or support such operations.

Figure 10:
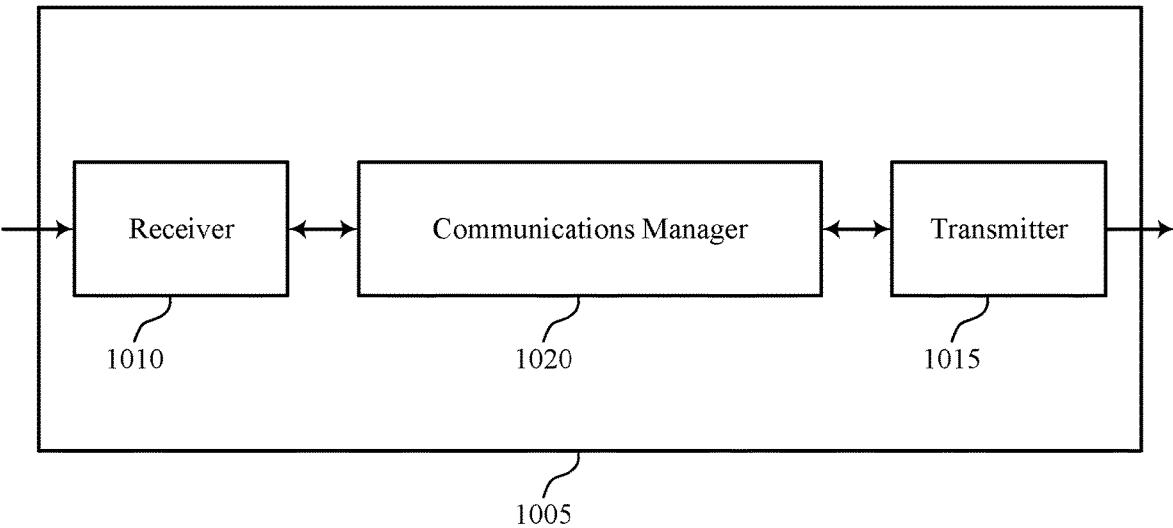
FIGS. 10 and 11 show block diagrams of devices that support prioritization for simultaneous uplink transmissions in accordance with one or more aspects of the present disclosure.

FIG. 10 shows a block diagram 1000 of a device 1005 that supports prioritization for simultaneous uplink transmissions in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of prioritization for simultaneous uplink transmissions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry), software (e.g., executable by a processor), or any combination thereof. The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory directly, indirectly, after pre-processing, or without pre-processing).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for providing for output to a UE signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The communications manager 1020 may be configured as or otherwise support a means for providing for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for a UE to cancel some or all of one or more uplink transmissions within a serving cell or CC based on an overlap in the time domain, the transmission group of the overlapping uplink transmissions, and a prioritization configuration between DG and CG based uplink transmissions.

Figure 11:
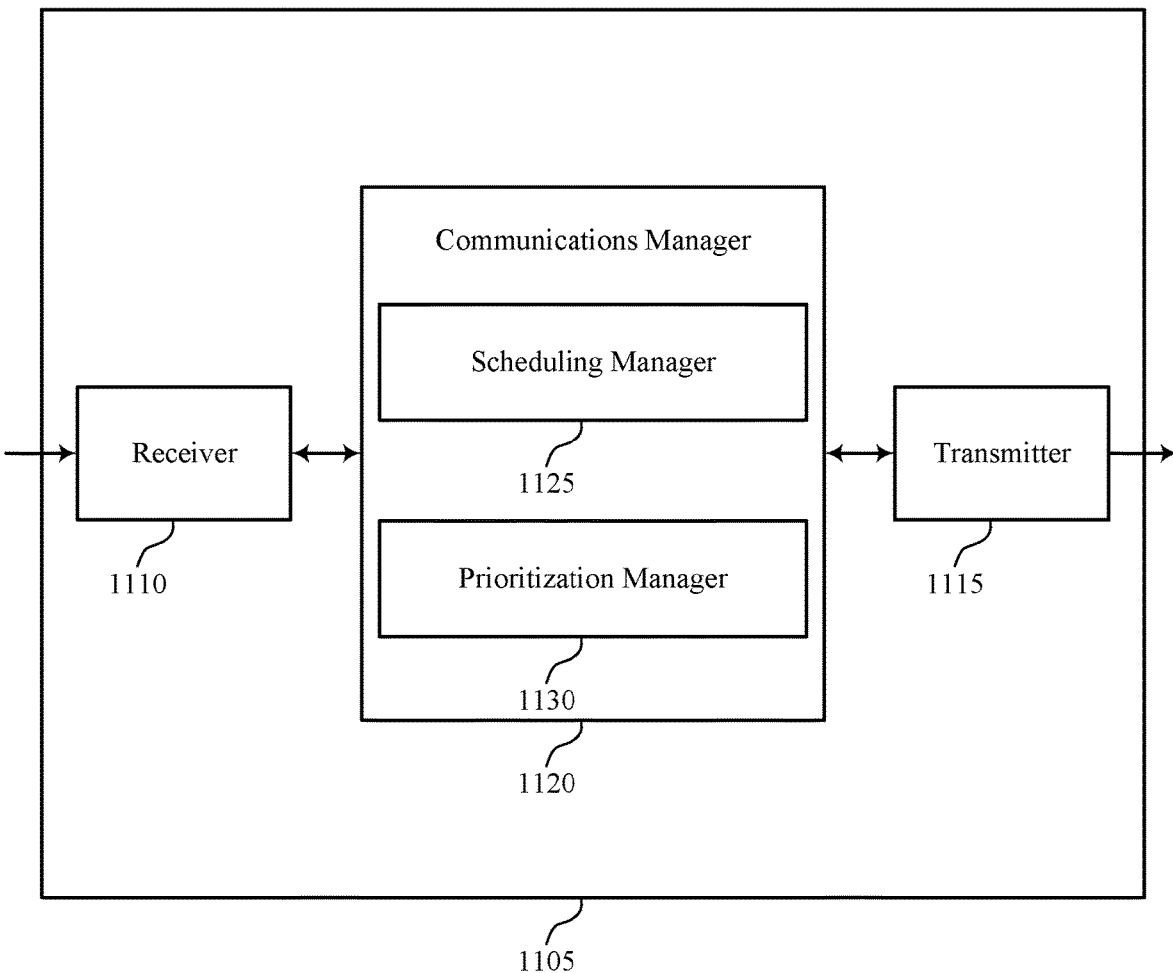

FIG. 11 shows a block diagram 1100 of a device 1105 that supports prioritization for simultaneous uplink transmissions in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of prioritization for simultaneous uplink transmissions as described herein. For example, the communications manager 1120 may include a scheduling manager 1125 a prioritization manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The scheduling manager 1125 may be configured as or otherwise support a means for providing for output to a UE signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The prioritization manager 1130 may be configured as or otherwise support a means for providing for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration.

Figure 12:
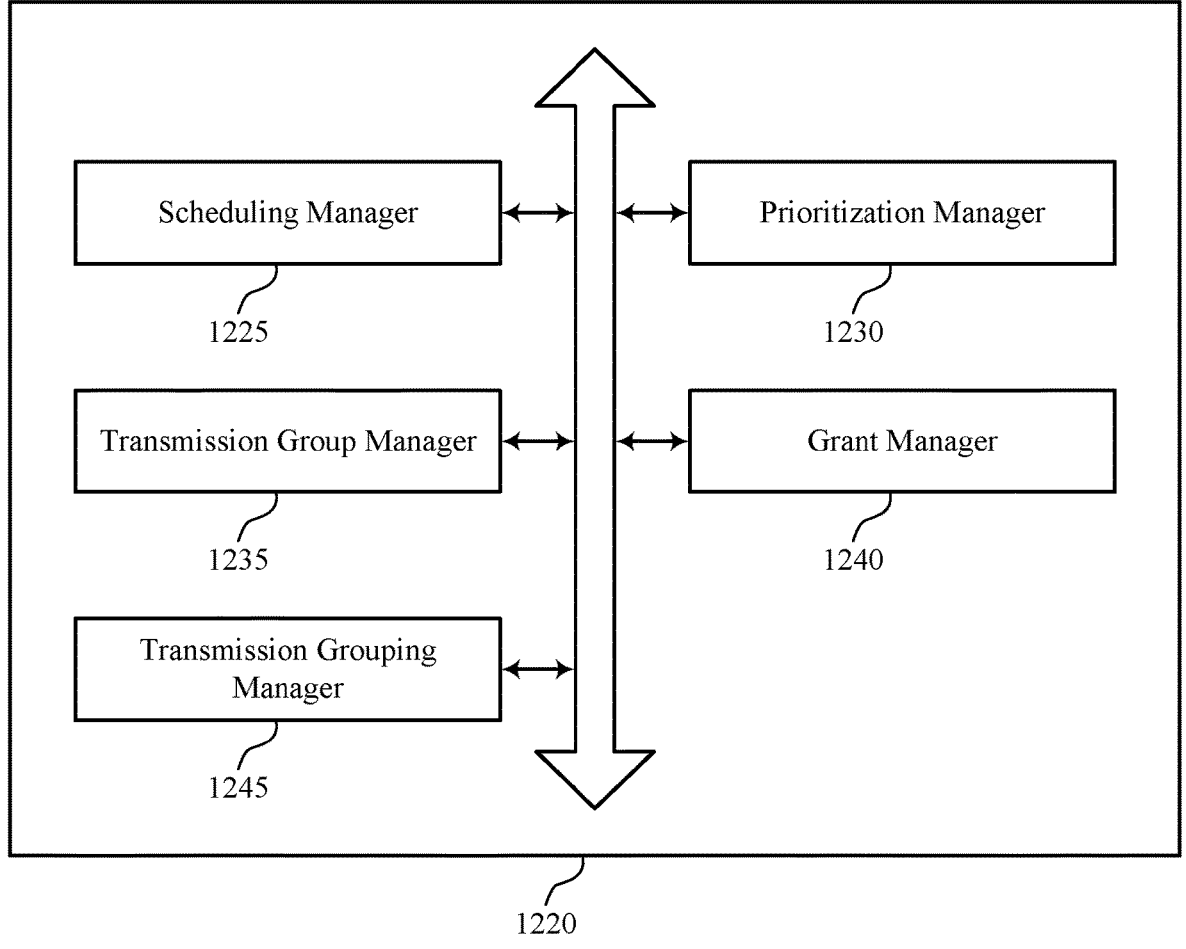
FIG. 12 shows a block diagram of a communications manager that supports prioritization for simultaneous uplink transmissions in accordance with one or more aspects of the present disclosure.

FIG. 12 shows a block diagram 1200 of a communications manager 1220 that supports prioritization for simultaneous uplink transmissions in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of prioritization for simultaneous uplink transmissions as described herein. For example, the communications manager 1220 may include a scheduling manager 1225, a prioritization manager 1230, a transmission group manager 1235, a grant manager 1240, a transmission grouping manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The scheduling manager 1225 may be configured as or otherwise support a means for providing for output to a UE signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The prioritization manager 1230 may be configured as or otherwise support a means for providing for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration.

In some examples, the one uplink transmission includes a low priority configured grant based uplink transmission and a remaining uplink transmission of the set of uplink transmissions includes a high priority dynamic grant based uplink transmission, the one uplink transmission and the remaining uplink transmission associated with the same transmission group. In some examples, the prioritization configuration indicates that the high priority dynamic grant based uplink transmission is prioritized over the low priority configured grant based uplink transmission.

In some examples, the one uplink transmission includes a low priority dynamic grant based uplink transmission and a remaining uplink transmission of the set of uplink transmissions includes a high priority configured grant based uplink transmission, the one uplink transmission and the remaining uplink transmission associated with the same transmission group. In some examples, the prioritization configuration indicates that the high priority configured grant based uplink transmission is prioritized over the low priority dynamic grant based uplink transmission.

In some examples, the transmission group manager 1235 may be configured as or otherwise support a means for providing for output to the UE an indication that at least two uplink transmissions of the set of uplink transmissions are associated with a same transmission group.

In some examples, to support providing for output to the UE the control message indicating the prioritization configuration, the grant manager 1240 may be configured as or otherwise support a means for providing for output to the UE an indication of the prioritization configuration prioritizing a high priority dynamic grant based uplink transmission over a low priority configured grant based uplink transmission.

In some examples, a control resource set pool index, an uplink beam, an uplink power control loop index, an antenna port, a timing advance command, a physical cell identifier, a synchronization signal block, a sounding reference signal resource identifier, or a combination thereof.

Figure 13:
FIG. 13 shows a diagram of a system including a device that supports prioritization for simultaneous uplink transmissions in accordance with one or more aspects of the present disclosure.

FIG. 13 shows a diagram of a system 1300 including a device 1305 that supports prioritization for simultaneous uplink transmissions in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting prioritization for simultaneous uplink transmissions). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for providing for output to a UE signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The communications manager 1320 may be configured as or otherwise support a means for providing for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration.

By including or configuring the communications manager 1320 in accordance with examples as described herein, the device 1305 may support techniques for a UE to cancel some or all of one or more uplink transmissions within a serving cell or CC based on an overlap in the time domain, the transmission group of the overlapping uplink transmissions, and a prioritization configuration between DG and CG based uplink transmissions.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 (e.g., directly, indirectly, after pre-processing, without pre-processing) to cause the device 1305 to perform various aspects of prioritization for simultaneous uplink transmissions as described herein, or the processor 1335 and the memory 1325 may be otherwise configured to perform or support such operations.

FIG. 14 shows a flowchart illustrating a method 1400 that supports prioritization for simultaneous uplink transmissions in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The operations of 1405 may be performed in accordance with examples as disclosed herein. In some examples, aspects of the operations of 1405 may be performed by a scheduling manager 825 as described with reference to FIG. 8.

At 1410, the method may include receiving a control message indicating a prioritization configuration for the set of uplink transmissions that at least partially overlap in the time domain. The operations of 1410 may be performed in accordance with examples as disclosed herein. In some examples, aspects of the operations of 1410 may be performed by a prioritization manager 830 as described with reference to FIG. 8.

At 1415, the method may include canceling at least an overlapping portion of one uplink transmission in the set of uplink transmissions based on the at least partial overlap in the time domain, the corresponding transmission group, and the prioritization configuration. The operations of 1415 may be performed in accordance with examples as disclosed herein. In some examples, aspects of the operations of 1415 may be performed by a cancellation manager 835 as described with reference to FIG. 8.

FIG. 15 shows a flowchart illustrating a method 1500 that supports prioritization for simultaneous uplink transmissions in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The operations of 1505 may be performed in accordance with examples as disclosed herein. In some examples, aspects of the operations of 1505 may be performed by a scheduling manager 825 as described with reference to FIG. 8.

At 1510, the method may include receiving a control message indicating a prioritization configuration for the set of uplink transmissions that at least partially overlap in the time domain. The operations of 1510 may be performed in accordance with examples as disclosed herein. In some examples, aspects of the operations of 1510 may be performed by a prioritization manager 830 as described with reference to FIG. 8.

At 1515, the method may include canceling at least an overlapping portion of one uplink transmission in the set of uplink transmissions based on the at least partial overlap in the time domain, the corresponding transmission group, and the prioritization configuration. The operations of 1515 may be performed in accordance with examples as disclosed herein. In some examples, aspects of the operations of 1515 may be performed by a cancelation manager 835 as described with reference to FIG. 8.

At 1520, the method may include canceling, within a component carrier associated with the set of uplink transmissions, at least the overlapping portion of the one uplink transmission, where the one uplink transmission is associated with a lowest priority within a same transmission group of the set of uplink transmissions. The operations of 1520 may be performed in accordance with examples as disclosed herein. In some examples, aspects of the operations of 1520 may be performed by a transmission group manager 840 as described with reference to FIG. 8.

FIG. 16 shows a flowchart illustrating a method 1600 that supports prioritization for simultaneous uplink transmissions in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The operations of 1605 may be performed in accordance with examples as disclosed herein. In some examples, aspects of the operations of 1605 may be performed by a scheduling manager 825 as described with reference to FIG. 8.

At 1610, the method may include receiving a control message indicating a prioritization configuration for the set of uplink transmissions that at least partially overlap in the time domain. The operations of 1610 may be performed in accordance with examples as disclosed herein. In some examples, aspects of the operations of 1610 may be performed by a prioritization manager 830 as described with reference to FIG. 8.

At 1615, the method may include canceling at least an overlapping portion of one uplink transmission in the set of uplink transmissions based on the at least partial overlap in the time domain, the corresponding transmission group, and the prioritization configuration. The operations of 1615 may be performed in accordance with examples as disclosed herein. In some examples, aspects of the operations of 1615 may be performed by a cancellation manager 835 as described with reference to FIG. 8.

At 1620, the method may include canceling, within a component carrier associated with the set of uplink transmissions, at least the overlapping portion of the at least one configured grant based uplink transmission that is different from at least two uplink transmissions within the set of uplink transmissions, where the at least two uplink transmissions are associated with different transmission groups and are dynamic grant based uplink transmissions. The operations of 1620 may be performed in accordance with examples as disclosed herein. In some examples, aspects of the operations of 1620 may be performed by a grant manager 845 as described with reference to FIG. 8.

FIG. 17 shows a flowchart illustrating a method 1700 that supports prioritization for simultaneous uplink transmissions in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include providing for output to a UE signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The operations of 1705 may be performed in accordance with examples as disclosed herein. In some examples, aspects of the operations of 1705 may be performed by a scheduling manager 1225 as described with reference to FIG. 12.

At 1710, the method may include providing for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration. The operations of 1710 may be performed in accordance with examples as disclosed herein. In some examples, aspects of the operations of 1710 may be performed by a prioritization manager 1230 as described with reference to FIG. 12.

FIG. 18 shows a flowchart illustrating a method 1800 that supports prioritization for simultaneous uplink transmissions in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include providing for output to a UE signaling that schedules a set of uplink transmissions that at least partially overlap in a time domain, the set of uplink transmissions including at least one dynamic grant based uplink transmission and at least one configured grant based uplink transmission, where each uplink transmission in the set of uplink transmissions is associated with a corresponding transmission group of a set of available transmission groups for simultaneous serving cell transmissions. The operations of 1805 may be performed in accordance with examples as disclosed herein. In some examples, aspects of the operations of 1805 may be performed by a scheduling manager 1225 as described with reference to FIG. 12.

At 1810, the method may include providing for output to the UE an indication that at least two uplink transmissions are associated with a same transmission group. The operations of 1810 may be performed in accordance with examples as disclosed herein. In some examples, aspects of the operations of 1810 may be performed by a transmission group manager 1235 as described with reference to FIG. 12.

At 1815, the method may include providing for output to the UE a control message indicating a prioritization configuration for the set of uplink transmissions that at least partially overlap in the time domain, where the UE cancels at least an overlapping portion of one uplink transmission in the set of uplink transmissions based on the at least partial overlap in the time domain, the corresponding transmission group, and the prioritization configuration. The operations of 1815 may be performed in accordance with examples as disclosed herein. In some examples, aspects of the operations of 1815 may be performed by a prioritization manager 1230 as described with reference to FIG. 12.

The following provides an overview of aspects of the present disclosure:

Aspect 1: A method for wireless communication at a UE, comprising: receiving signaling that schedules a set of uplink transmissions that at least partially overlap in a time domain, the set of uplink transmissions including at least one DG based uplink transmission and at least one CG based uplink transmission, wherein each uplink transmission in the set of uplink transmissions is associated with a corresponding transmission group of a set of available transmission groups for simultaneous serving cell transmissions; receiving a control message indicating a prioritization configuration for the set of uplink transmissions that at least partially overlap in the time domain; and canceling at least an overlapping portion of one uplink transmission in the set of uplink transmissions based at least in part on the at least partial overlap in the time domain, the corresponding transmission group, and the prioritization configuration.

Aspect 2: The method of aspect 1, wherein canceling at least the overlapping portion of one uplink transmission in the set of uplink transmissions comprises: canceling, within a component carrier associated with the set of uplink transmissions, at least the overlapping portion of the one uplink transmission, wherein the one uplink transmission is associated with a lowest priority within a same transmission group of the set of uplink transmissions.

Aspect 3: The method of aspect 2, wherein the one uplink transmission comprises a LP CG based uplink transmission and a remaining uplink transmission of the set of uplink transmissions comprises a HP DG based uplink transmission, the one uplink transmission and the remaining uplink transmission associated with the same transmission group; and the prioritization configuration indicates that the HP DG based uplink transmission is prioritized over the LP CG based uplink transmission.

Aspect 4: The method of any of aspects 2 through 3, wherein the one uplink transmission comprises a LP DG based uplink transmission and a remaining uplink transmission of the set of uplink transmissions comprises a HP CG based uplink transmission, the one uplink transmission and the remaining uplink transmission associated with the same transmission group; and the prioritization configuration indicates that the HP CG based uplink transmission is prioritized over the LP DG based uplink transmission.

Aspect 5: The method of any of aspects 2 through 4, wherein the at least one CG based uplink transmission is associated with a transmission group of the set of available transmission groups based at least in part on one or more of a default transmission group for CG based uplink transmissions, a received indication of the transmission group of the at least one CG based uplink transmission, or a transmission group of received DCI that activates the at least one CG based uplink transmission.

Aspect 6: The method of any of aspects 2 through 5, wherein the prioritization configuration is configured on a per-transmission group basis.

Aspect 7: The method of any of aspects 1 through 6, wherein canceling at least the overlapping portion of one uplink transmission in the set of uplink transmissions comprises: canceling, within a component carrier associated with the set of uplink transmissions, at least the overlapping portion of the at least one CG based uplink transmission that is different from at least two uplink transmissions within the set of uplink transmissions, wherein the at least two uplink transmissions are associated with different transmission groups and are DG based uplink transmissions.

Aspect 8: The method of aspect 7, wherein canceling at least the overlapping portion of one uplink transmission in the set of uplink transmissions comprises: canceling at least the overlapping portion of the at least one CG based uplink transmission prior to a first symbol of the at least one CG based uplink transmission that overlaps with a first DG based uplink transmission, with a second DG based uplink transmission, or a combination thereof, in the at least two uplink transmissions.

Aspect 9: The method of aspect 8, further comprising: determining a first starting symbol of the first DG based uplink transmission and a second starting symbol of the second DG based uplink transmission; and identifying the first symbol of the at least one CG based uplink transmission that overlaps with the first DG based uplink transmission, the second DG based uplink transmission, or the combination thereof, based at least in part on the first starting symbol or the second starting symbol.

Aspect 10: The method of any of aspects 1 through 9, wherein canceling at least the overlapping portion of one uplink transmission in the set of uplink transmissions comprises: canceling, within a component carrier associated with the set of uplink transmissions, at least the overlapping portion of a DG based uplink transmission from at least two uplink transmissions within the set of uplink transmissions, wherein the at least two uplink transmissions are associated with different transmission groups and the DG based uplink transmission comprises a LP uplink transmission.

Aspect 11: The method of aspect 10, wherein the prioritization configuration indicates that a HP CG based uplink transmission is prioritized over a LP DG based uplink transmission.

Aspect 12: The method of any of aspects 10 through 11, wherein canceling at least the overlapping portion of one uplink transmission in the set of uplink transmissions comprises: canceling at least the overlapping portion of a first DG based uplink transmission, a second DG based uplink transmission, or a combination thereof, of the at least two uplink transmissions prior to a first symbol of the corresponding DG based uplink transmission that overlaps with the at least one CG based uplink transmission in the set of uplink transmissions, wherein the at least one CG based uplink transmission comprises a HP uplink transmission.

Aspect 13: The method of aspect 12, wherein canceling at least the overlapping portion of one uplink transmission in the set of uplink transmissions comprises: canceling at least the overlapping portion of the first DG based uplink transmission or the second DG based uplink transmission based on one or more of a transmission group, an earliest start time, an earliest end time, a latest start time, a latest end time, a duration, a number of overlapping symbols, a modulation and coding scheme, or a combination thereof, of the first DG based uplink transmission, the second DG based uplink transmission, or both.

Aspect 14: The method of any of aspects 1 through 13, wherein the transmission group of each of at least two uplink transmissions in the set of uplink transmissions is defined according to one or more of a control resource set pool index, an uplink beam, an uplink power control loop index, an antenna port, a timing advance command, a physical cell identifier, a synchronization signal block, a sounding reference signal resource identifier, or a combination thereof.

Aspect 15: A method for wireless communication at a network entity, comprising: providing for output to a UE signaling that schedules a set of uplink transmissions that at least partially overlap in a time domain, the set of uplink transmissions including at least one DG based uplink transmission and at least one CG based uplink transmission, wherein each uplink transmission in the set of uplink transmissions is associated with a corresponding transmission group of a set of available transmission groups for simultaneous serving cell transmissions; and providing for output to the UE a control message indicating a prioritization configuration for the set of uplink transmissions that at least partially overlap in the time domain, wherein the UE cancels at least an overlapping portion of one uplink transmission in the set of uplink transmissions based at least in part on the at least partial overlap in the time domain, the corresponding transmission group, and the prioritization configuration.

Aspect 16: The method of aspect 15, wherein the one uplink transmission comprises a LP CG based uplink transmission and a remaining uplink transmission of the set of uplink transmissions comprises a HP DG based uplink transmission, the one uplink transmission and the remaining uplink transmission associated with the same transmission group; and the prioritization configuration indicates that the HP DG based uplink transmission is prioritized over the LP CG based uplink transmission.

Aspect 17: The method of any of aspects 15 through 16, wherein the one uplink transmission comprises a LP DG based uplink transmission and a remaining uplink transmission of the set of uplink transmissions comprises a HP CG based uplink transmission, the one uplink transmission and the remaining uplink transmission associated with the same transmission group; and the prioritization configuration indicates that the HP CG based uplink transmission is prioritized over the LP DG based uplink transmission.

Aspect 18: The method of any of aspects 15 through 17, further comprising: providing for output to the UE an indication that at least two uplink transmissions in the set of uplink transmissions are associated with a same transmission group.

Aspect 19: The method of any of aspects 15 through 18, wherein providing for output to the UE the control message indicating the prioritization configuration comprises: providing for output to the UE an indication of the prioritization configuration prioritizing a HP DG based uplink transmission over a LP CG based uplink transmission.

Aspect 20: The method of any of aspects 15 through 19, wherein the corresponding transmission group of each of at least two uplink transmissions in the set of uplink transmissions is defined according to one or more of a control resource set pool index, an uplink beam, an uplink power control loop index, an antenna port, a timing advance command, a physical cell identifier, a synchronization signal block, a sounding reference signal resource identifier, or a combination thereof.

Aspect 21: An apparatus for wireless communication at a UE, comprising at least one processor; and memory coupled with the at least one processor, the memory storing instructions executable by the at least one processor to cause the UE to perform a method of any of aspects 1 through 14.

Aspect 22: An apparatus for wireless communication at a UE, comprising at least one means for performing a method of any of aspects 1 through 14.

Aspect 23: A non-transitory computer-readable medium storing code for wireless communication at a UE, the code comprising instructions executable by a processor to perform a method of any of aspects 1 through 14.

Aspect 24: An apparatus for wireless communication at a network entity, comprising at least one processor; and memory coupled with the at least one processor, the memory storing instructions executable by the at least one processor to cause the network entity to perform a method of any of aspects 15 through 20.

Aspect 25: An apparatus for wireless communication at a network entity, comprising at least one means for performing a method of any of aspects 15 through 20.

Aspect 26: A non-transitory computer-readable medium storing code for wireless communication at a network entity, the code comprising instructions executable by a processor to perform a method of any of aspects 15 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), or ascertaining. Also, "determining" can include receiving (such as receiving information) or accessing (such as accessing data in a memory). Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor; and
   memory coupled with the at least one processor, the memory storing instructions executable by the at least one processor to cause the UE to:
      receive signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions;
   receive a control message indicating a prioritization configuration for the set of uplink transmissions that at least partially overlap in the time domain; and
   cancel at least an overlapping portion of one uplink transmission in the set of uplink transmissions based at least in part on the at least partial overlap in the time domain, the corresponding transmission group, and the prioritization configuration, wherein the corresponding transmission group is associated with a control resource set pool index and comprises the one uplink transmission and at least one remaining uplink transmission of the set of uplink transmissions.

2. The apparatus of claim 1, wherein the instructions to cancel at least the overlapping portion of one uplink transmission in the set of uplink transmissions are executable by the at least one processor to cause the UE to:
   cancel, within a component carrier associated with the set of uplink transmissions, at least the overlapping portion of the one uplink transmission, wherein the one uplink transmission is associated with a lowest priority within the corresponding transmission group of the set of uplink transmissions.

3. The apparatus of claim 2, wherein:
   the one uplink transmission comprises a low priority configured grant based uplink transmission and the at least one remaining uplink transmission of the set of uplink transmissions comprises a high priority dynamic grant based uplink transmission; and
   the prioritization configuration indicates that the high priority dynamic grant based uplink transmission is prioritized over the low priority configured grant based uplink transmission.

4. The apparatus of claim 2, wherein:
   the one uplink transmission comprises a low priority dynamic grant based uplink transmission and the at least one remaining uplink transmission of the set of uplink transmissions comprises a high priority configured grant based uplink transmission; and
   the prioritization configuration indicates that the high priority configured grant based uplink transmission is prioritized over the low priority dynamic grant based uplink transmission.

5. The apparatus of claim 2, wherein the at least one configured grant based uplink transmission is associated with a transmission group of the set of available transmission groups based at least in part on one or more of a default transmission group for configured grant based uplink transmissions, a received indication of the transmission group of the at least one configured grant based uplink transmission, or a transmission group of received downlink control information that activates the at least one configured grant based uplink transmission.

6. The apparatus of claim 2, wherein the prioritization configuration is configured on a per-transmission group basis.

7. The apparatus of claim 1, wherein the instructions to cancel at least the overlapping portion of one uplink transmission in the set of uplink transmissions are executable by the at least one processor to cause the UE to:
   cancel, within a component carrier associated with the set of uplink transmissions, at least the overlapping portion of the at least one configured grant based uplink transmission that is different from at least two uplink transmissions within the set of uplink transmissions, wherein the at least two uplink transmissions are associated with different transmission groups and are dynamic grant based uplink transmissions.

8. The apparatus of claim 7, wherein the instructions to cancel at least the overlapping portion of one uplink transmission in the set of uplink transmissions are executable by the at least one processor to cause the UE to:

cancel at least the overlapping portion of the at least one configured grant based uplink transmission prior to a first symbol of the at least one configured grant based uplink transmission that overlaps with a first dynamic grant based uplink transmission, with a second dynamic grant based uplink transmission, or a combination thereof, in the at least two uplink transmissions.

9. The apparatus of claim 8, wherein the instructions are further executable by the at least one processor to cause the UE to:

determine a first starting symbol of the first dynamic grant based uplink transmission and a second starting symbol of the second dynamic grant based uplink transmission; and identify the first symbol of the at least one configured grant based uplink transmission that overlaps with the first dynamic grant based uplink transmission, the second dynamic grant based uplink transmission, or the combination thereof, based at least in part on the first starting symbol or the second starting symbol.

10. The apparatus of claim 1, wherein the instructions to cancel at least the overlapping portion of one uplink transmission in the set of uplink transmissions are executable by the at least one processor to cause the UE to:

cancel, within a component carrier associated with the set of uplink transmissions, at least the overlapping portion of a dynamic grant based uplink transmission from at least two uplink transmissions within the set of uplink transmissions, wherein the at least two uplink transmissions are associated with different transmission groups and the dynamic grant based uplink transmission comprises a low priority uplink transmission.

11. The apparatus of claim 10, wherein the prioritization configuration indicates that a high priority configured grant based uplink transmission is prioritized over a low priority dynamic grant based uplink transmission.

12. The apparatus of claim 10, wherein the instructions to cancel at least the overlapping portion of one uplink transmission in the set of uplink transmissions are executable by the at least one processor to cause the UE to:

cancel at least the overlapping portion of a first dynamic grant based uplink transmission, a second dynamic grant based uplink transmission, or a combination thereof, of the at least two uplink transmissions prior to a first symbol of the corresponding dynamic grant based uplink transmission that overlaps with the at least one configured grant based uplink transmission in the set of uplink transmissions, wherein the at least one configured grant based uplink transmission comprises a high priority uplink transmission.

13. The apparatus of claim 12, wherein the instructions to cancel at least the overlapping portion of one uplink transmission in the set of uplink transmissions are executable by the at least one processor to cause the UE to:

cancel at least the overlapping portion of the first dynamic grant based uplink transmission or the second dynamic grant based uplink transmission based on one or more of a transmission group, an earliest start time, an earliest end time, a latest start time, a latest end time, a duration, a number of overlapping symbols, a modulation and coding scheme, or a combination thereof, of the first dynamic grant based uplink transmission, the second dynamic grant based uplink transmission, or both.

14. The apparatus of claim 1, wherein the corresponding transmission group of each of at least two uplink transmissions in the set of uplink transmissions is defined according to one or more of the control resource set pool index, an uplink beam, an uplink power control loop index, an antenna port, a timing advance command, a physical cell identifier, a synchronization signal block, a sounding reference signal resource identifier, or a combination thereof.

15. An apparatus for wireless communication at a network entity, comprising:

at least one processor; and memory coupled with the at least one processor, the memory storing instructions executable by the at least one processor to cause the network entity to:

provide for output to a user equipment (UE) signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions; and provide for output to the UE a control message indicating a prioritization configuration for the set of uplink transmissions that at least partially overlap in the time domain, wherein at least an overlapping portion of one uplink transmission in the set of uplink transmissions is cancelled based at least in part on the at least partial overlap in the time domain, the corresponding transmission group, and the prioritization configuration, and wherein the corresponding transmission group is associated with a control resource set pool index and comprises the one uplink transmission and at least one remaining uplink transmission of the set of uplink transmissions.

16. The apparatus of claim 15, wherein:

the one uplink transmission comprises a low priority configured grant based uplink transmission and the at least one remaining uplink transmission of the set of uplink transmissions comprises a high priority dynamic grant based uplink transmission; and the prioritization configuration indicates that the high priority dynamic grant based uplink transmission is prioritized over the low priority configured grant based uplink transmission.

17. The apparatus of claim 15, wherein:

the one uplink transmission comprises a low priority dynamic grant based uplink transmission and the at least one remaining uplink transmission of the set of uplink transmissions comprises a high priority configured grant based uplink transmission; and the prioritization configuration indicates that the high priority configured grant based uplink transmission is prioritized over the low priority dynamic grant based uplink transmission.

18. The apparatus of claim 15, wherein the instructions are further executable by the at least one processor to cause the network entity to:

provide for output to the UE an indication that at least two uplink transmissions in the set of uplink transmissions are associated with a same transmission group.

19. The apparatus of claim 15, wherein the instructions to provide for output to the UE the control message indicating the prioritization configuration are executable by the at least one processor to cause the network entity to:

provide for output to the UE an indication of the prioritization configuration prioritizing a high priority dynamic grant based uplink transmission over a low priority configured grant based uplink transmission.

20. The apparatus of claim 15, wherein the corresponding transmission group of each of at least two uplink transmissions in the set of uplink transmissions is defined according to one or more of the control resource set pool index, an uplink beam, an uplink power control loop index, an antenna port, a timing advance command, a physical cell identifier, a synchronization signal block, a sounding reference signal resource identifier, or a combination thereof.

21. A method for wireless communication at a user equipment (UE), comprising:

receiving signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions;

receiving a control message indicating a prioritization configuration for the set of uplink transmissions that at least partially overlap in the time domain; and canceling at least an overlapping portion of one uplink transmission in the set of uplink transmissions based at least in part on the at least partial overlap in the time domain, the corresponding transmission group, and the prioritization configuration, wherein the corresponding transmission group is associated with a control resource set pool index and comprises the one uplink transmission and at least one remaining uplink transmission of the set of uplink transmissions.

22. The method of claim 21, wherein canceling at least the overlapping portion of one uplink transmission in the set of uplink transmissions comprises:

canceling, within a component carrier associated with the set of uplink transmissions, at least the overlapping portion of the one uplink transmission, wherein the one uplink transmission is associated with a lowest priority within the corresponding transmission group of the set of uplink transmissions.

23. The method of claim 22, wherein:

the one uplink transmission comprises a low priority configured grant based uplink transmission and the at least one remaining uplink transmission of the set of uplink transmissions comprises a high priority dynamic grant based uplink transmission; and the prioritization configuration indicates that the high priority dynamic grant based uplink transmission is prioritized over the low priority configured grant based uplink transmission.

24. The method of claim 22, wherein:

the one uplink transmission comprises a low priority dynamic grant based uplink transmission and the at least one remaining uplink transmission of the set of uplink transmissions comprises a high priority configured grant based uplink transmission; and the prioritization configuration indicates that the high priority configured grant based uplink transmission is prioritized over the low priority dynamic grant based uplink transmission.

25. The method of claim 22, wherein the at least one configured grant based uplink transmission is associated with a transmission group of the set of available transmission groups based at least in part on one or more of a default transmission group for configured grant based uplink transmissions, a received indication of the transmission group of the at least one configured grant based uplink transmission, or a transmission group of received downlink control information that activates the at least one configured grant based uplink transmission.

26. The method of claim 22, wherein the prioritization configuration is configured on a per-transmission group basis.

27. The method of claim 21, wherein canceling at least the overlapping portion of one uplink transmission in the set of uplink transmissions comprises:

canceling, within a component carrier associated with the set of uplink transmissions, at least the overlapping portion of the at least one configured grant based uplink transmission that is different from at least two uplink transmissions within the set of uplink transmissions, wherein the at least two uplink transmissions are associated with different transmission groups and are dynamic grant based uplink transmissions.

28. The method of claim 27, wherein canceling at least the overlapping portion of one uplink transmission in the set of uplink transmissions comprises:

canceling at least the overlapping portion of the at least one configured grant based uplink transmission prior to a first symbol of the at least one configured grant based uplink transmission that overlaps with a first dynamic grant based uplink transmission, with a second dynamic grant based uplink transmission, or a combination thereof, in the at least two uplink transmissions.

29. The method of claim 28, further comprising:

determining a first starting symbol of the first dynamic grant based uplink transmission and a second starting symbol of the second dynamic grant based uplink transmission; and identifying the first symbol of the at least one configured grant based uplink transmission that overlaps with the first dynamic grant based uplink transmission, the second dynamic grant based uplink transmission, or the combination thereof, based at least in part on the first starting symbol or the second starting symbol.

30. A method for wireless communication at a network entity, comprising:

providing for output to a user equipment (UE) signaling that schedules a set of uplink transmissions that at least partially overlap in a time domain, the set of uplink transmissions including at least one dynamic grant based uplink transmission and at least one configured grant based uplink transmission, wherein each uplink transmission in the set of uplink transmissions is associated with a corresponding transmission group of a set of available transmission groups for simultaneous serving cell transmissions; and providing for output to the UE a control message indicating a prioritization configuration for the set of uplink transmissions that at least partially overlap in the time domain, wherein at least an overlapping portion of one uplink transmission in the set of uplink transmissions is cancelled based at least in part on the at least partial overlap in the time domain, the corresponding transmission group, and the prioritization configuration, and wherein the corresponding transmission group is associated with a control resource set pool index and comprises the one uplink transmission and at least one remaining uplink transmission of the set of uplink transmissions.

* * * * *